(12) United States Patent
Ramesh et al.

(10) Patent No.: US 8,392,925 B2
(45) Date of Patent: Mar. 5, 2013

(54) SYNCHRONIZATION MECHANISMS BASED ON COUNTERS

(75) Inventors: Ananthakrishna Ramesh, Cupertino, CA (US); James M. Magee, Orlando, FL (US)

(73) Assignee: Apple Inc., Cupertino, CA (US)

( * ) Notice: Subject to any disclaimer, the term of this patent is extended or adjusted under 35 U.S.C. 154(b) by 1014 days.

(21) Appl. No.: 12/412,325

(22) Filed: Mar. 26, 2009

(65) Prior Publication Data

US 2010/0250809 A1    Sep. 30, 2010

(51) Int. Cl.
*G06F 12/00* (2006.01)
(52) U.S. Cl. .................................. 718/102; 718/103
(58) Field of Classification Search .................. None
See application file for complete search history.

(56) References Cited

U.S. PATENT DOCUMENTS

| | | | | |
|---|---|---|---|---|
| 6,836,853 | B1 * | 12/2004 | Dover et al. ............... | 713/502 |
| 7,051,026 | B2 * | 5/2006 | Berry et al. ............... | 1/1 |
| 7,500,037 | B2 * | 3/2009 | Adams et al. ............... | 710/200 |
| 7,512,950 | B1 * | 3/2009 | Marejka ............... | 718/106 |
| 2003/0115347 | A1 * | 6/2003 | Wolrich et al. ............... | 709/230 |
| 2004/0199734 | A1 * | 10/2004 | Rajamani et al. ............... | 711/163 |
| 2004/0220951 | A1 * | 11/2004 | Howard et al. ............... | 707/100 |
| 2005/0289549 | A1 * | 12/2005 | Cierniak et al. ............... | 718/102 |
| 2007/0124728 | A1 * | 5/2007 | Rosenbluth et al. ............... | 718/100 |
| 2008/0294648 | A1 * | 11/2008 | Lin et al. ............... | 707/10 |
| 2008/0313434 | A1 * | 12/2008 | Naoi ............... | 712/216 |

OTHER PUBLICATIONS

Thomley, John et al., Monotonic Counters: A New Mechanism for Thread Synchronization, 2000, IEEE, 13 pages.*

* cited by examiner

*Primary Examiner* — Eric Coleman
(74) *Attorney, Agent, or Firm* — Blakely, Sokoloff, Taylor & Zafman LLP

(57) ABSTRACT

A method and apparatus which maintain a plurality of counters to synchronize a plurality of requests for a lock independent of interlocks. The plurality of counters include a lock counter and an unlock counter. The requests wait in a wait queue maintained separately from the counters without direct access between the counters and the wait queue. The lock counter indicates a cumulative number of lock requests to acquire the lock. The unlock counter indicates a cumulative number of unlock requests to release the lock acquired. One or more requests waiting for the lock are selected according to the counters to be granted with the lock when the lock is released. A request corresponds to a task performing synchronized operations when granted with the lock.

70 Claims, 22 Drawing Sheets

400

Atomically updating (or maintaining) one or more counters from a current state to an updated state (e.g. counting up a lock counter indicating a cumulative number of requests for a lock and/or counting up a waiter counter indicating the number of of the requests still waiting for the lock) to request for a lock to perform synchronized operations 401

Calling a first kernel interface with the updated state of the counters to wait (or block) for a return with a return state (e.g. including status flags indicating statuses of the lock) of the counters specified by the kernel when the lock is granted 403

Determining a first state to update the counters from a current state at the time of the return, the first state indicating statuses of the lock granted according to the return state, the current state and a predefined state transition table 405

Performing the synchronized operations 407

Atomically updating the counters from a current state to an update state to release the lock (e.g. counting up an unlock counter indicating a cumulative number of requests having released the lock) to 411

Calling a second kernel interface with the updated state of the counters to indicate the lock is released, the second kernel interface returning with a return state (e.g. based on a most recent state of the counters) specified by the kernel 413

Updating the counters from a current state based on the return state and the current state of the counters (e.g. resetting the counters) 415

Bit set for status flags
from the kernel 1501

|  | | W 1509 | E 1511 | WE 1513 |
|---|---|---|---|---|
| Bit set retrieved from status flags 1503 | W | T 1505 | T | T |
|  | E | X 1507 | T | X |
|  | WE | T | T | T |

W: (10)
E: (01)
WE: (11)

T: generating an updated bit set
X: handling errors for illegal state

Fig. 15

| # | Sq | Ops | | L | U | WC | | Wait Queue (of Kernel) |
|---|---|---|---|---|---|---|---|---|
| 1 | [1] | RL1 | ←--→ | 1 | 0 | 0 | | |
| 2 | | WL2 | --→ | 2W | 0 | 1 | --→ | WL2 |
| 3 | | RL3 | --→ | 3W | 0 | 2 | --→ | WL2-RL3 |
| 4 | | RL4 | --→ | 4W | 0 | 3 | --→ | WL2-RL3-RL4 |
| 5 | | WL5 | --→ | 5W | 0 | 4 | --→ | WL2-RL3-RL4-WL5 |
| 6 | | RL6 | --→ | 6W | 0 | 5 | --→ | WL2-RL3-RL4-WL5-RL6 |
| 7 | | UL1 | ←-- | 6W | 1 | 5 | --→ | RL3-RL4-WL5-RL6 |
| 8 | | | ←-- | 6WE | 1 | 5 | ←-- | RL3-RL4-WL5-RL6 |
| 9 | [2] | WL2 | --→ | 6WE | 2 | 4 | --→ | WL5-RL6 |
| 10 | | UL2 | ←-- | 6W | 2 | 4 | ←-- | WL5-RL6 |
| 11 | | | ←--→ | 6W | 2 | 4 | | |
| 12 | [3] | RL3 | ←-- | 6W | 2 | 3 | ←-- | WL5-RL6 |
| 13 | [3] | RL4 | ←-- | 6W | 2 | 2 | ←-- | WL5-RL6 |
| 14 | | UL3 | --→ | 6W | 3 | 2 | | |
| 15 | [4] | UL4 | ←-- | 6W | 4 | 2 | --→ | RL6 |
| 16 | | UL4 | ←-- | 6E | 4 | 2 | ←-- | RL6 |
| 17 | | WL5 | --→ | 6E | 4 | 1 | --→ | RL6 |
| 18 | | UL5 | ←-- | 6 | 5 | 1 | ←-- | |
| 19 | [5] | UL5 | ←-- | 6 | 5 | 1 | ←-- | |
| 20 | | RL6 | ←-- | 6 | 6 | 0 | | |
| 21 | | UL6 | --→ | 6 | 0 | 0 | | |
| 22 | | UL6 | ←-- | 0 | 0 | 0 | | |

Barriers     1900A

| Ops | | L | U | Queue |
|---|---|---|---|---|
| B_Init | ↔ | 0 | 3 | |
| BW1 | → | 1 | 3 | BW1 |
| BW2 | → | 2 | 3 | BW1-BW2 |
| BW3 | → | 3 | 3 | BW1-BW2 |
| BW3 | ◄ BST | 0 | 0 | BW1-BW2 |
| BW1 | ← 0 — | 0 | 0 | BW2 |
| BW2 | ← 0 — | 0 | 0 | |

Semaphore     1900B

| Ops | | L | U | Queue |
|---|---|---|---|---|
| sem_wait1 | → | 1 | 0 | SW1 |
| sem_wait2 | → | 2 | 0 | SW1-SW2 |
| sem_post1 | ↔ | 2 | 1 | SW1-SW2 |
| sem_wait1 | ← | 2 | 1 | SW2 |
| sem_post2 | → | 2 | 2 | SW2 |
| sem_post2 | ← | 0 | 0 | SW2 |
| sem_wait2 | ← | 0 | 0 | |

Fig. 19C

Condition Variable     1900C

| Ops | | L | U | Queue |
|---|---|---|---|---|
| CWT1 | → | 1 | 0 | T1 |
| CWT2 | → | 2 | 0 | T1-T2 |
| CST3 | → | 2 | 1 | T1-T2 |
| | ← | 2 | 1 | T1-T2 |
| CWT1 | ← | 2 | 1 | T2 |
| CST3 | → | 2 | 2 | T2 |
| | ← | 0 | 0 | |
| CWT2 | ← | 0 | 0 | |

2000

Pthread_rwlock_rdlock() : short read  2001

Pthread_rwlock_long_rdlock_np() : long read 2003

Pthread_rwlock_wrlock() : write  2005

Pthread_rwlock_yielding_wrlock_np() : yielding write 2007

Fig. 20

SYNCHRONIZATION MECHANISMS BASED ON COUNTERS

FIELD OF INVENTION

The present invention relates generally to synchronization mechanisms. More particularly, this invention relates to using counters to support synchronizers without the use of interlocks.

BACKGROUND

Modern operating systems for computing devices typically support parallel programming to enable concurrent execution of a plurality of applications running different tasks to increase device throughput or speed up interface responses. Usually, concurrent execution require synchronization to coordinate asynchronous activities among different tasks. Most operating systems provide synchronization primitives to facilitate synchronization for programming concurrent tasks. However, depending on how such primitives are implemented, the overhead incurred to allow multiple tasks to execute in parallel may differ from one operating system to another.

For example, multiple threads or processes may be synchronized via synchronization primitive (or synchronizer) such as mutex (a thread may be the minimum scheduling entity of a process for an application). Typical implementation for a mutex may include an interlock in user-space memory that may require continuously polling the contents of the memory by each thread or process trying to participate in the use of the mutex (via a primitive, lock, unlock, try, etc.). As a result, valuable processing resources are wasted when a thread or process interacts with that mutex.

Additionally, an interlock based synchronization primitive may degrade responsiveness of real-time threads or processes. For example, a preemptive task scheduler, as commonly adopted in most operating systems, may force a thread or a process associated with an interlock to be removed from a processor with a preemptive event. An interlock implemented in user-space memory may be associated with the thread or process without kernel interactions. As a result, the scheduler does no know that the interlock is held by the particular thread or process when it is preempted. A subsequent real-time thread or process that attempts to interact with the same interlock may have to (e.g. at least temporarily) relinquish its real-time characteristics in order to allow the thread or process that was preempted to release the interlock. It must do so without the scheduler knowing which thread or process needs to be scheduled to release the contended interlock. This is known as an unbounded priority inversion—something that must be avoided in real-time systems.

A typical solution is to move the complete implementation of the synchronizer into the kernel, so the scheduler always knows which thread or process holds the interlock and can prevent preemption for the duration. Although such a solution does not introduce unbounded priority inversions, it adds latency to each synchronization operation in order to make the transition to the appropriate kernel interface.

Therefore, traditional implementations of synchronization primitives for computing devices fail to support real-time characteristics of modern multitasking applications without incurring a latency penalty.

SUMMARY OF THE DESCRIPTION

An embodiment of the present invention includes a method and apparatus to maintain a plurality of counters including a lock counter and an unlock counter to synchronize a plurality of requests for a lock. The lock counter indicates a cumulative number of lock requests to acquire the lock. The unlock counter indicates a cumulative number of unlock requests to release the lock acquired. One or more requests waiting for the lock are selected for granting the lock according to the counters when the lock is released. A request corresponds to a task performing synchronized operations when granted with the lock.

In an alternative embodiment, one or more counters are maintained to synchronize a plurality of requests for a lock. The counters have a state including count values of the counters at an instance of time. A first kernel interface is called with argument data according to a first state of the counters to wait for the lock. A second state of the counters is returned from the first kernel interface as part of return data. Synchronized operations are performed subsequent to updating the counters atomically based on the second state.

In another alternative embodiment, one or more counters are maintained to synchronize a plurality of lock requests. Each lock request is associated with a lock count indicating a cumulative number of the lock requests initiated for a lock when the lock request is received in a wait queue. In response to receiving an unlock request to release the lock, a state of the counters is compared with the unlock request to determine whether to expect additional lock requests. If no additional lock request is expected, one or more lock requests are selected from the wait queue to grant the lock to performing synchronized operations.

In yet another alternative embodiment, a lock counter is counted up atomically to wait for a lock to synchronize operations among a plurality of tasks. Synchronized operations are performed for at least one of the plurality of tasks when the lock is granted. The unlock counter is count up atomically subsequent to the synchronized operations.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 is a flow diagram illustrating an embodiment of a process to count counters for requesting a lock to perform synchronized operations;

FIG. 15 is an example of a state transition table for updating status flags for counters according to one embodiment of present invention;

FIG. 16 is a sequence diagram illustrating example sequences to synchronize reader and writer lock requests using counters according to one embodiment of the present invention;

FIGS. 18 and 19 are sequence diagrams illustrating different variations of synchronization schemes based on counters according to one embodiment of the present invention;

FIG. 20 describes exemplary APIs (application programming interface) for synchronization based on counters according to one embodiment of the present invention.

DETAILED DESCRIPTION

Figure 1:
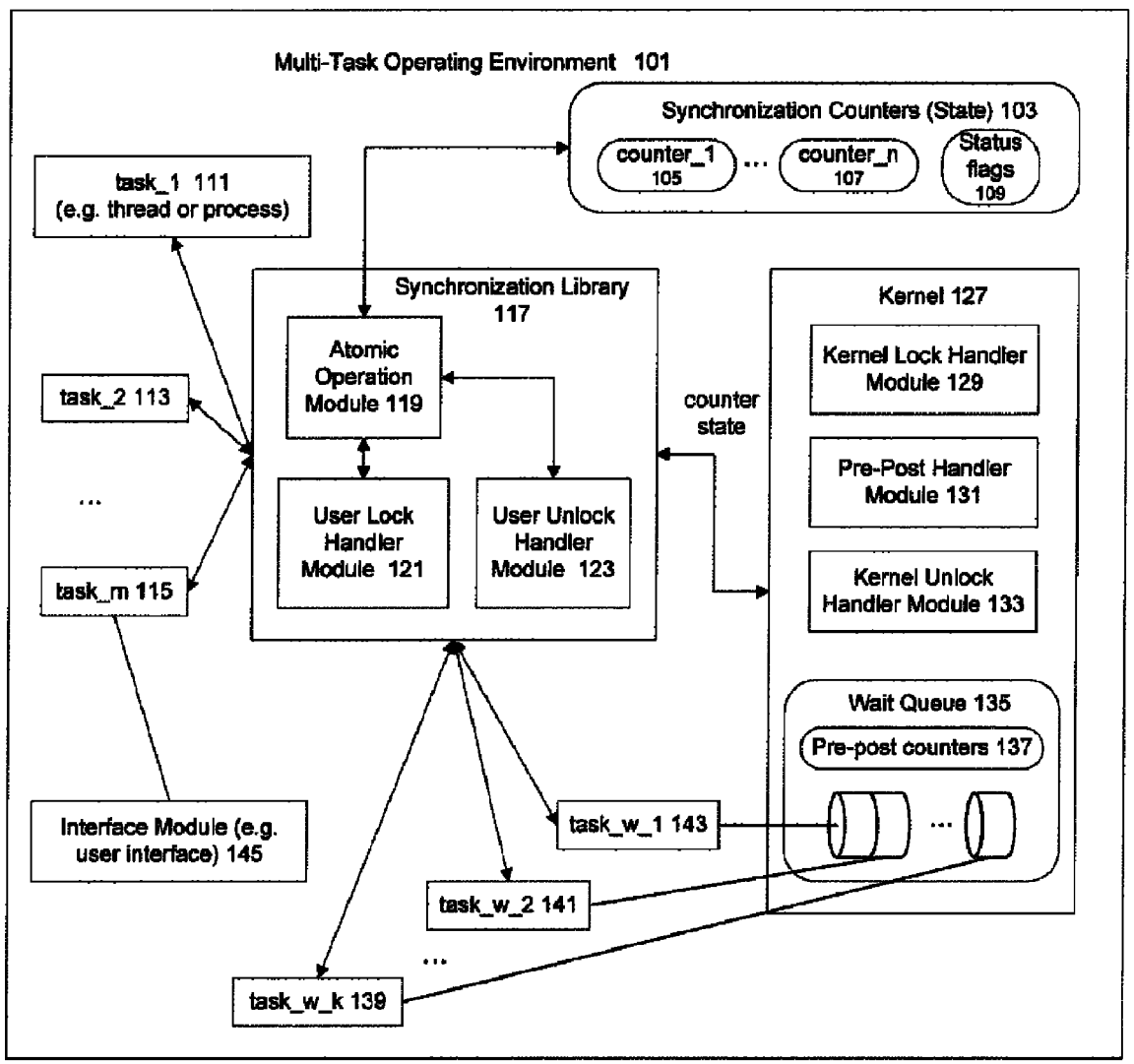
FIG. 1 is a block diagram illustrating one embodiment of system components for synchronization using counters.

A method and an apparatus for a counter based synchronization mechanism are described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

According to certain embodiments, synchronization mechanisms are provided using a plurality of operational sequence counters for POSIX (Portable Operating System Interface) based synchronizers (e.g. at user level) without using user level global data or per synchronizer (or synchronization primitive) interlock. Counters may be updated based on atomic instructions. When contending tasks (or threads, processes) block, kernel calls may be made carrying sequence counts of the counters as part of argument data for the calls. The kernel may not need to access or modify a lock associated with the counters to support a synchronization primitive. Thus, lock content may remain at user level (or in user space) in an operating environment.

In one embodiment, the kernel provides different policies to assign ownership of a lock to waiting tasks based on sequence counts from argument data of an interface call to support a variety of synchronization primitives, such as mutex, event, critical section, barrier, semaphore, conditional variables, readers/writer lock, etc. For example, a lock may be assigned in a strict fair share manner, e.g. following a sequence of lock attempts or requests. In other embodiments, CPU priority may be used as a hint to decide how a lock should be granted. Priority ceiling and/or inheritance based on identifiers of owners (tasks) of a lock may be applied for lock assignment. The term "lock" may refer to generic synchronization primitives or synchronizers including barriers, semaphore, condition variables and other primitives.

A lock bit or a bit flag may be used to avoid inadvertent releasing (or freeing) of a lock. In one embodiment, a lock bit enables a first fit policy to assign ownership to a lock. For example, when an unlock request arrives to release a lock, a lock bit may be reset to allow any task contending at the time to grab the ownership of the lock. Therefore, a contending thread already running on a core requiring only a very short time period for performing synchronized operations may be allowed the ownership of the lock without blocking. As a result, synchronization overhead, such as acquiring and dropping a lock, may be reduced. In some embodiments, synchronization primitives shared across address spaces, such as POSIX pshared mode, are supported based on sequence counters.

FIG. 1 is a block diagram illustrating one embodiment of system components synchronization using counters. System 100 may include a multitasking operating environment 101 such as, for example, in an iPhone operating system for a mobile device or a Mac OS X operating system for a desktop computer. Operating environment 101 may host a plurality of tasks, such as task_1 111, task_2 113 ... task_w_1 143 ... and task_w_k 139. Each task may be a process or a thread within a process. In some embodiments, a task includes multiple processes and/or multiple threads. A task may perform data processing operations synchronized with other tasks in the multitasking operations environment 101. For example, multiple tasks may access common resources, such as reading and/or writing to a common file stored in a storage device and/or interacting with a graphic component to perform user interface processing (e.g. rendering and presenting graphic data), e.g. via an interface module 145.

In one embodiment, operating environment 101 provides a synchronization mechanism via a synchronization library 117 linked with different tasks. Synchronization library 117 may be accessed at a user level supporting standard synchronization APIs, e.g. based on POSIX standard. Synchronization library 117 may include APIs outside of POSIX standard. In one embodiment, a synchronization library 117 includes an atomic operation module 119 to update counters for a lock. An atomic operation may be a set of operations that can be combined together appeared as one single operation with only two possible outcomes as either a success or a failure. For example, the atomic operation module 119 may implement an atomic operation using CAS (Compare And Swap) instructions provided by a processor. Other instructions which can be used to implement lock-free or wait-free algorithms for atomic operations may be included.

In one embodiment, a synchronization library 117 includes a user lock handler module 121 and a user unlock handler module 123 to manage synchronization requests from tasks. Typically, synchronizing a group of tasks may be coordinated based on a data structure or a synchronization identifier such as a lock. For example, a task (e.g. task_1 111, task_2 113 or task_m 115) makes a request for a lock (a lock request) to perform synchronized operations via the user lock handler module 121. Once a task completes the synchronized operations, it releases the lock (or sending an unlock request) for other waiting tasks (e.g. task_w_1 143, task_w_2 141, or task_w_k 139) via the user unlock handler module 123.

A lock may be associated with synchronization counters 103 representing a state of the lock synchronizing a group of tasks. In one embodiment, synchronization counters 103 include one or more counters, e.g. counter_1 105 and counter_n 107, having counts as integer sequence values. Synchronization counters 103 may include status flags 109 as a set of bits (or status bits) indicating binary statuses. In response to synchronization requests from tasks, the synchronization library 117 may create the synchronization counters 103 together with a corresponding lock. The synchronization counters 103 may be updated atomically via the atomic operation module 119. In one embodiment, the synchronization library 117 maintains the synchronization counters 103 and communicates with a kernel 127 including passing lock and/or unlock requests with snapshots of counters 125 back and forth to coordinate granting and releasing of the corresponding lock. A snapshot of a state may include the counts of the synchronization counters 103 retrieved at a particular instance of time.

In one embodiment, a task waits for a lock in a wait queue 135 associated with the lock within a kernel 127. The wait queue 135 may store lock requests for the corresponding tasks, e.g. task_w_1 143, task_w_2 141 or task_w_139, waiting for the lock. In one embodiment, the wait queue 135 includes pre-post counters for indicating, for example, whether there are additional lock requests expected to be inserted into the wait queue 135. In one embodiment, a kernel lock handler module 129 and a kernel unlock handler module 133 process a lock request and an unlock request respectively according to interface calls invoked from the synchronization library 117. A pre-post handler module 131 may maintain, e.g. atomically, the pre-post counters 137 according to counter states passed along with the lock or unlock requests from the synchronization library 117.

Figure 2:
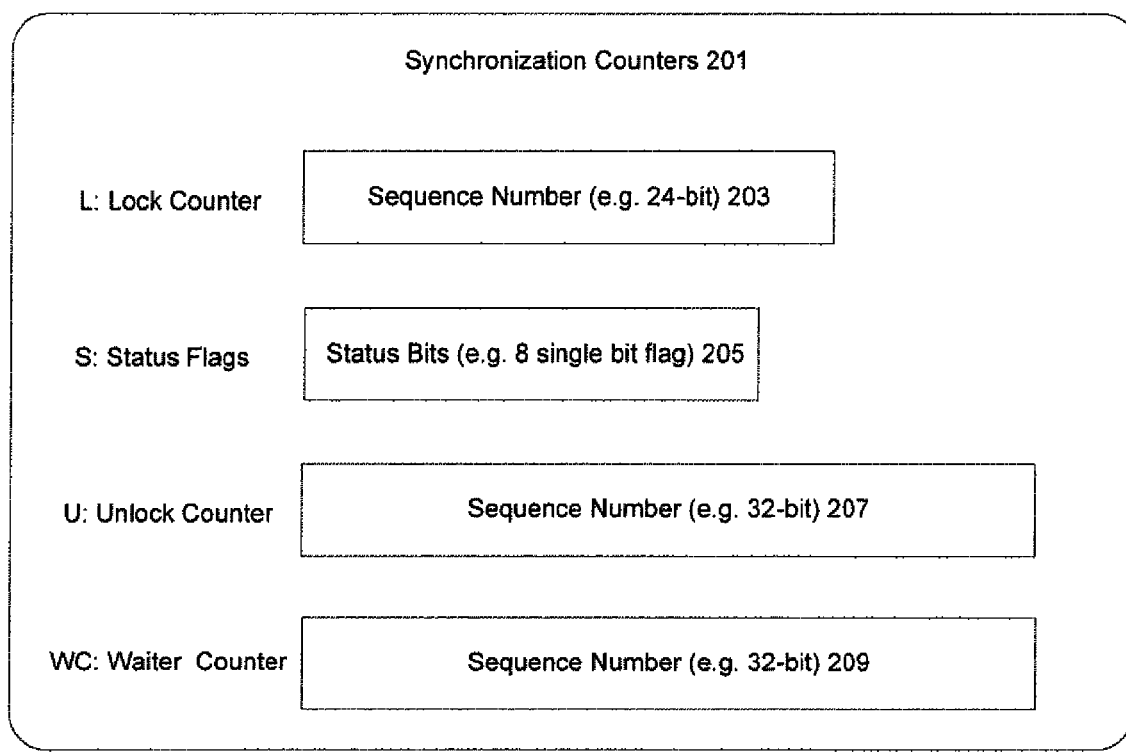
FIG. 2 is a block diagram illustrating one embodiment of synchronization counters counting sequences numbers.

FIG. 2 is a block diagram illustrating one embodiment of synchronization counters counting sequences numbers. The synchronization counters 103 of FIG. 1 may be implemented according to counters 200. In one embodiment, synchronization counters 201 include three 32-bit data units, such as three integers in a 32-bit based computing device. A lock counter (L) 203 and status flags (S) 205 may reside in a single 32-bit data unit, occupying 24 bits and 8 bits respectively. A count (sequence number) of counter L 203 may indicate a cumulative or total number of lock requests initiated over a period of time. Each status flag 205 may be associated with a single bit or a plurality of bits. An unlock counter (U) 207 may be a 32-bit integer for a count indicating a cumulative number of unlock requests to release a lock during a period of time, e.g. corresponding to lock counter L 203. A waiter counter (WC) 209 may be a 32-bit integer for a count indicating the number of waiters (or tasks) still waiting in a wait queue for a lock. In one embodiment, implementations of synchronization counter 201 are based on atomic operations supported by underlying hardware architectures, such as a compare and set operation (CAS) to update counter L 203 and WC 209 together atomically. Other arrangements for allocating synchronization counters, e.g. according to 64-bit integers, may be applicable. Synchronization counters such as lock counters and/or unlock counters may implement synchronizers supporting generic synchronization primitives including, but not limited to, e.g. locks, mutexes, barriers, semaphores, critical sections, events, and or condition variables, etc.

Figure 3:
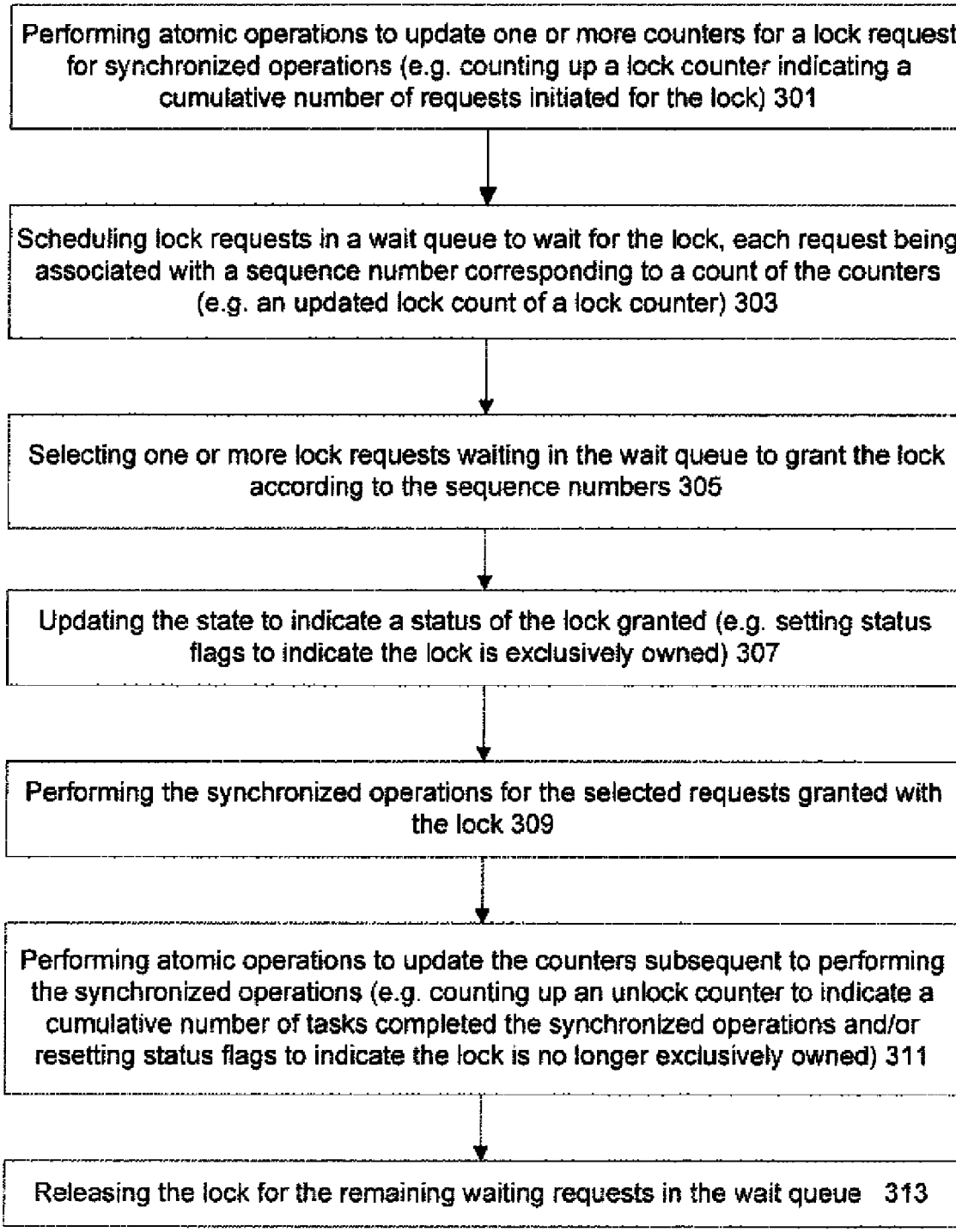
FIG. 3 is a flow diagram illustrating an embodiment of a process to grant requests to perform synchronization operations based on counters.

FIG. 3 is a flow diagram illustrating an embodiment of a process to grant requests to perform synchronization operations based on counters. Exemplary process 300 may be performed by a processing logic that may include hardware (circuitry, dedicated logic, etc.), software (such as is run on a dedicated machine), or a combination of both. For example, process 300 may be performed by system 100 of FIG. 1. At block 301, according to one embodiment, the processing logic of process 300 performs atomic operations to update one or more counters for a lock request to perform synchronized operations. For example, a lock counter, such as in synchronized counters 103 of FIG. 1, may be counted up to indicate a cumulative number of requests for a lock over a period of time. A lock of synchronized operations may support a variety of synchronization schemes such as based on, for example, mutex, critical section, conditional variables, or semaphore etc. Multiple tasks may synchronize among each other via a single lock to perform respective synchronized operations corresponding to each task.

An atomic operation may be a CAS operation. In one embodiment, the processing logic of process 300 atomically counts up by one a lock counter from its current count when a request for a lock is initiated. A current count of a counter may be based on a snapshot (or retrieval) of synchronization counters at an instance of time. In one embodiment, a CAS operation to count up a counter from a current count succeeds only when the counter has not been changed from the current count (or blocked from counting with the current count) at the time the counter is updated with a count up number. The processing logic of process 300 may continuously taking snapshots of the synchronization counters and performing atomic operations to update synchronization counters (e.g. counting up a lock counter) until the atomic operation is successfully applied.

In one embodiment, at block 303, the processing logic of process 300 schedules lock requests in a wait queue, such as wait queue 135 of FIG. 1. Each lock request may be assigned a sequence number according to, for example, a lock count counted up for initiating the lock request. Thus, sequence numbers associated with lock requests for a lock may be monotonically and consecutively ordered. A lock request may be associated with the sequence number of the lock counter when the lock request arrives. Each lock request may be assigned a unique sequence number among all requests for a single lock. In some embodiments, if a lock request is not contended (e.g. the only one requesting the lock) and the lock is available (not yet granted), the lock request acquires the lock and returns after updating the counters and status bits without accessing kernel resources (e.g. waiting in the wait queue).

At block 307, according to one embodiment, the processing logic of process 300 selects one or more lock requests waiting in the wait queue to grant the lock. A lock may be exclusively granted to at most one single lock request at a given time. The processing logic of process 305 may select a lock request to grant a lock according to an unlock request releasing the lock, e.g. when a corresponding task to the unlock request completes synchronized operations after being granted with the lock. In one embodiment, a lock request is selected from a wait queue as ordered according to the unique sequence number associated with the lock request. In some embodiments, more than one lock requests may be granted with the lock at the same time. For example, multiple readers are allowed to access a common file together.

The processing logic of process 300 may update the counters at block 307 to indicate a status of the lock granted. In one embodiment, for example, the processing logic of process set an exclusive flag in the counters, such as in status flags 109 of FIG. 1, when a lock is granted to a lock request requesting exclusive ownership of the lock. A task to perform synchronized operations as a writer writing to a file may request a lock granted exclusively. In another embodiment, the processing logic of process 300 may set a wait flag in the counters to indicate there is at least one request for the lock as a writer remaining in the wait queue.

At block 309, the processing logic of process 300 may proceed to perform synchronized operations for tasks corresponding to the selected lock requests granted with the lock. Subsequently, at block 311, when completing the synchronized operations, the processing logic of process 300 may update the counters atomically to indicate completion of synchronized operations for the selected requests. For example, the processing logic of process 300 my count up an unlock counter, such as counter U of FIG. 2, indicating a cumulative number of tasks completing the operations synchronized by the lock. The processing logic of process 300 may update the counters to reset an exclusive flag to indicate a lock is no longer exclusively owned. At block 313, the lock may be released for the remaining lock requests still waiting in the wait queue. In one embodiment, the processing logic of process 300 determines the lock is no longer needed based on current counts of the counters.

FIG. 4 is a flow diagram illustrating an embodiment of a process to count counters for requesting a lock to perform synchronized operations. Exemplary process 400 may be performed by a processing logic that may include hardware (circuitry, dedicated logic, etc.), software (such as is run on a dedicated machine), or a combination of both. For example, process 400 may be performed by system 100 of FIG. 1. At block 401, the processing logic of process 400 updates one or more counters to request for a lock to perform synchronized operations. The counters may include a lock counter indicating a cumulative number of requests initiated for the lock, an unlock counter indicating a cumulative number of the requests having released the lock, a waiter counter indicating a number of requests still waiting for the lock, and/or status flags indicating one or more statuses of the lock, such as counters L 203, U 207, WC 209 and S 205 in FIG. 2. In one embodiment, the processing logic of process 400 maintains the counters corresponding to the lock. In some embodiments, the counters are allocated from a hash memory in user space (e.g. without kernel privilege) responding to a first request initiated for the corresponding lock.

The counters may be updated atomically, such as based on CAS operations. Each atomic operation may update all the counters together or selectively update a portion of the counters. In one embodiment, the processing logic of process 400 takes a snapshot of the counters to determine an updated state for the counters. A snapshot of the counters may correspond to a state of the counters retrieved at an instance of time. A state of the counters may include counts and status values of the counters. In one embodiment, the processing logic of process 400 updates the lock counter and the wait counter to indicate a new request for the lock. When an atomic operation to update the counters fails, the processing logic of process 400 may repeat the atomic operation until the counters are successfully updated.

In one embodiment, at block 403, the processing logic of process 400 calls a first kernel interface to wait for the lock. The first kernel interface may be based on a function call provided by a kernel which has access to privileged data and structures allocated for the lock. In one embodiment, the processing logic of process 400 passes argument data for requesting the lock via the first kernel interface. The argument data may include a state of the counters, such as an updated state for counting up the lock counter and the waiter counter based on a snapshot of the counters. Typically, the argument data may include a lock identifier along with a lock count, an unlock count, a waiter count and status bits. Once the lock is granted, the processing logic of process 400 may return from the first interface kernel with a return data indicating a return state of the counters. In one embodiment, the return state of the counters may be based on a state of the counters at the time when the lock is granted. In addition, the return state may include status flags updated to reflect status information related to the lock granted, for example, whether the lock is exclusively granted and/or whether there are writers (i.e. lock requests for the lock as writers) waiting for the lock.

At block 411, according to one embodiment, the processing logic of process 400 updates the counters to release the lock. For example, the processing logic of process 400 may count up a current count retrieved from the unlock counter. The unlock counter may indicate a cumulative number of requests having released the lock. In some embodiments, at block 413, the processing logic of process 400 calls a second kernel interface with an updated state of the counters (e.g. the up counted count of the lock counter) for granting the lock to the waiting requests. The processing logic of process 400 may not block to return from the second kernel interface with a return state of the counters specified by the kernel, which may reflect a more recent state of the counters than the updated state. In one embodiment, at block 415, the processing logic of process 400 may determine to update the counters according to a current state and the return state of the counters. For example, the processing logic of process 400 may reset the counters to start counting up from preset initial values (e.g. 0).

Figure 5:
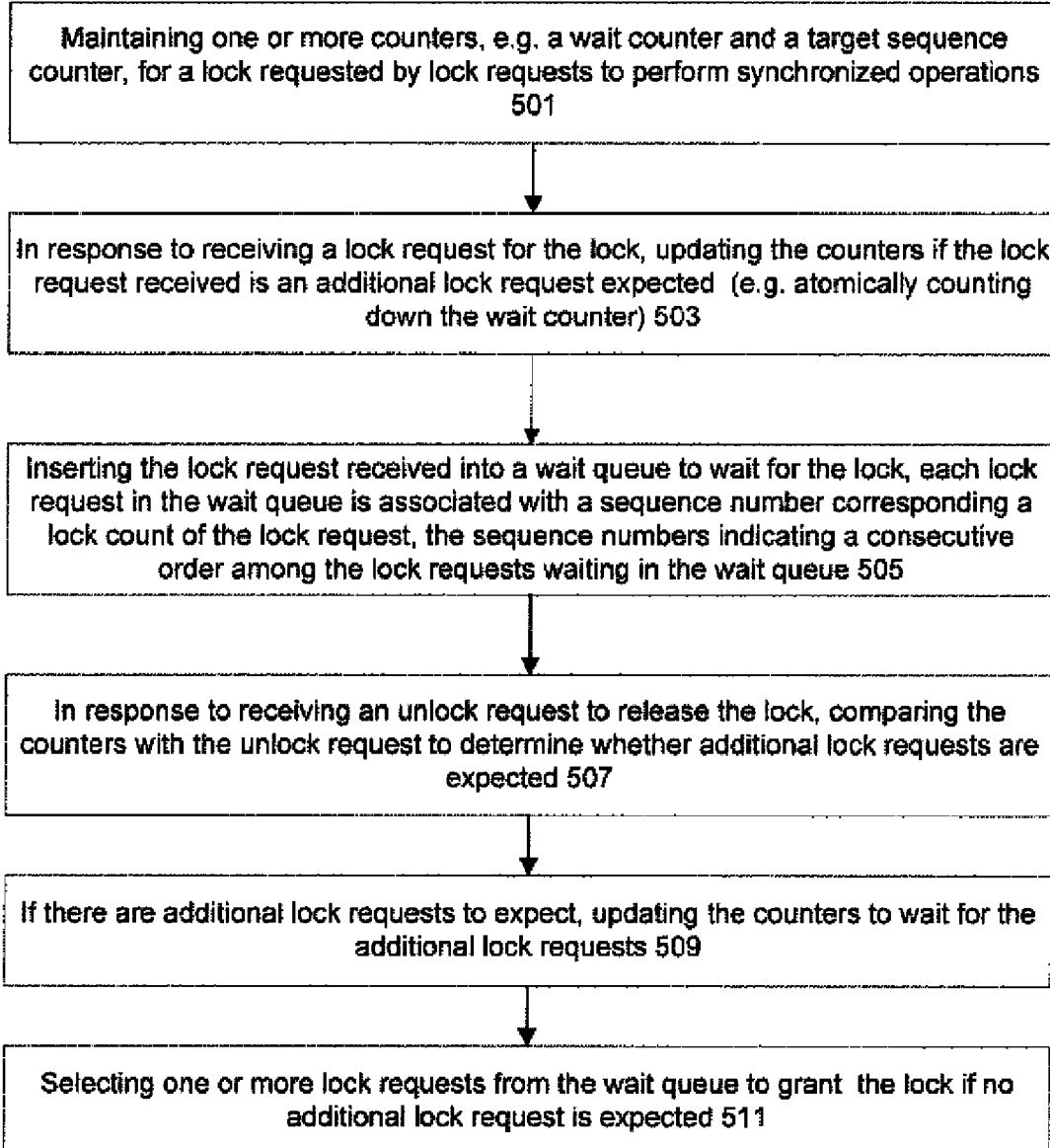
FIG. 5 is a flow diagram illustrating an embodiment of a process to grant a lock based on a wait queue for synchronized operations using counters.

FIG. 5 is a flow diagram illustrating an embodiment of a process to grant a lock based on a wait queue for synchronized operations using counters. Exemplary process 500 may be performed by a processing logic that may include hardware (circuitry, dedicated logic, etc.), software (such as is run on a dedicated machine), or a combination of both. For example, process 500 may be performed by the kernel 127 of system 100 of FIG. 1. At block 501, in one embodiment, the processing logic of process 500 maintains one or more counters for a lock for synchronizing a group of tasks, e.g. task_1 111 . . . task_m 115, task_w_1 143 . . . task_w_k 139 of FIG. 1, to perform synchronized operations. Each task may correspond to a lock request for the lock. A lock request may be associated with a sequence number identifying an order among lock requests received at different time. In one embodiment, the processing logic of the process 500 may allocate multiple counters corresponding to a lock, such as a wait counter and a target sequence counter for a lock.

When receiving a lock request at block 503, the processing logic of process 500 may update the counters. For example, if the lock request received is an additional lock request expected, the processing logic of process 500 may count down (e.g. atomically) the wait counter (e.g. a pre-post wait counter inside a kernel). In some embodiments, the processing logic of process 500 may count down the wait counter based on kernel data protection mechanism associated with, e.g., mutex lock or spin lock. A lock request may be associated with a lock count, e.g. embedded inside an argument data of an interface call, indicating a cumulative number of lock requests already initiated. In one embodiment, the processing logic of the process 500 compares the lock count of the lock request received with the counters, e.g. the target sequence counter, to determine if the lock request received is an additional lock request expected.

At block 505, the processing logic of process 500 may insert the lock request into a wait queue to wait for the lock. A lock request may be assigned with a sequence number corresponding to a lock count associated with the lock request. In one embodiment, the processing logic of process 500 maintains a consecutive sequence order among lock requests waiting in a wait queue according to the corresponding sequence numbers. Additional lock requests expected may be identified if there are missing gaps in the consecutive sequence of the sequence numbers in a wait queue (e.g. sequence number 4 may be missing from a sequence of numbers 2, 3, 5).

In one embodiment, at block 507, the processing logic of process 50 determines whether there are additional lock requests to expect in response to an unlock request to release the lock. Typically, an unlock request corresponds to a lock request previously granted with the lock. When a task finishes performing synchronized operations according to a lock granted, a corresponding unlock request may be generated to release the lock. An unlock request may be associated with an unlock count (or a sequence number), e.g. embedded inside an argument data of an interface call, indicating a cumulative number of unlock requests already generated to release the lock. In one embodiment, an unlock request is also associated with a lock count. The processing logic of process 500 may inspect the wait queue according to the lock and unlock counts associated with the unlock request to determine if there are additional lock requests to expect.

If there are additional lock requests to expect, at block 509, the processing logic of process 500 may update the counters to wait for the additional lock requests expected. The counters may be updated to specify sequence numbers to identify the additional lock requests expected. Otherwise, at block 511, the processing logic of process 500 may select one or more lock requests from the wait queue to grant the lock. In one embodiment, the selected lock requests may be associated of sequence numbers consecutive in order in the wait queue.

Figure 6:
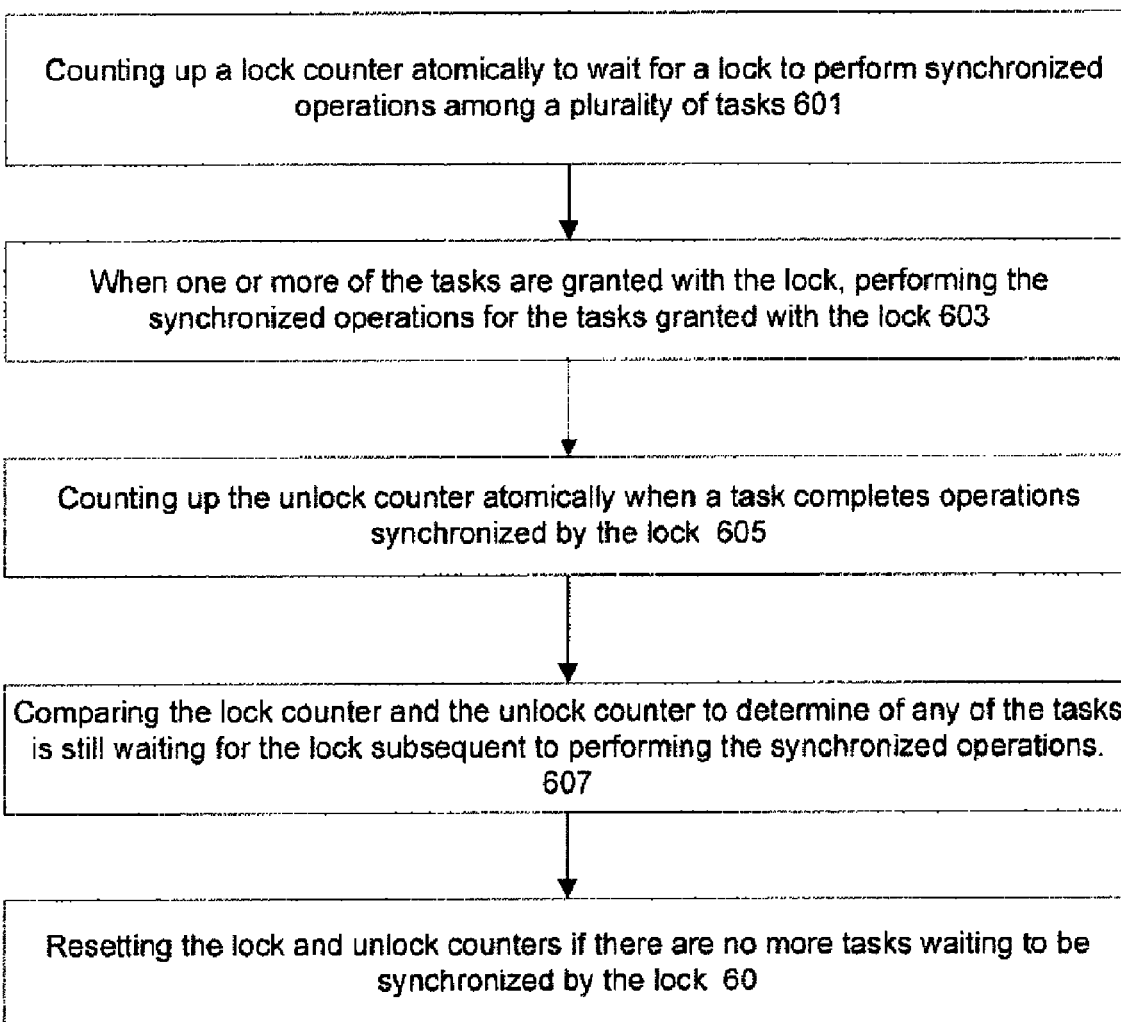
FIG. 6 is a flow diagram illustrating an embodiment of a process to provide synchronization mechanisms maintaining a lock counter and an unlock counter.

FIG. 6 is a flow diagram illustrating an embodiment of a process to provide synchronization mechanisms maintaining a lock counter and an unlock counter. Exemplary process 600 may be performed by a processing logic that may include hardware (circuitry, dedicated logic, etc.), software (such as is run on a dedicated machine), or a combination of both. For example, process 600 may be performed by system 100 of FIG. 1. At block 601, in one embodiment, the processing logic of process 600 atomically counts up a lock counter, such as counter L 203 of FIG. 2, to wait for a lock to perform operations synchronized among a group of tasks. In one embodiment, the processing logic of process 600 retrieves a current count of the lock counter to atomically count up the lock counter from the current count by one. An atomic operation to count up the lock count from the current count may fail if the lock count has been changed from the current count prior to the atomic operation.

At block 603, in one embodiment, the processing logic of process 600 performs operations (e.g. synchronized operations) simultaneously for one or more tasks granted with the lock. Once the synchronized operations for a task are completed, the processing logic of process 600 may count up atomically an unlock counter. In one embodiment, at block 605, the processing logic of process 600 counts up an unlock counter from a current unlock count of the unlock counter by one. If the atomic up counting of the unlock counter is successful, at block 607, the processing logic of process 600 may compare the lock and unlock counters to determine if there is any remaining task waiting to be synchronized by the lock. The processing logic of process 600 may reset the lock and unlock counters at block 609 if no more tasks are waiting to be synchronized by the lock according to the comparison (e.g. counts from the lock and unlock counters are equal).

Exemplary Process to Synchronize a Reader

Figure 7:
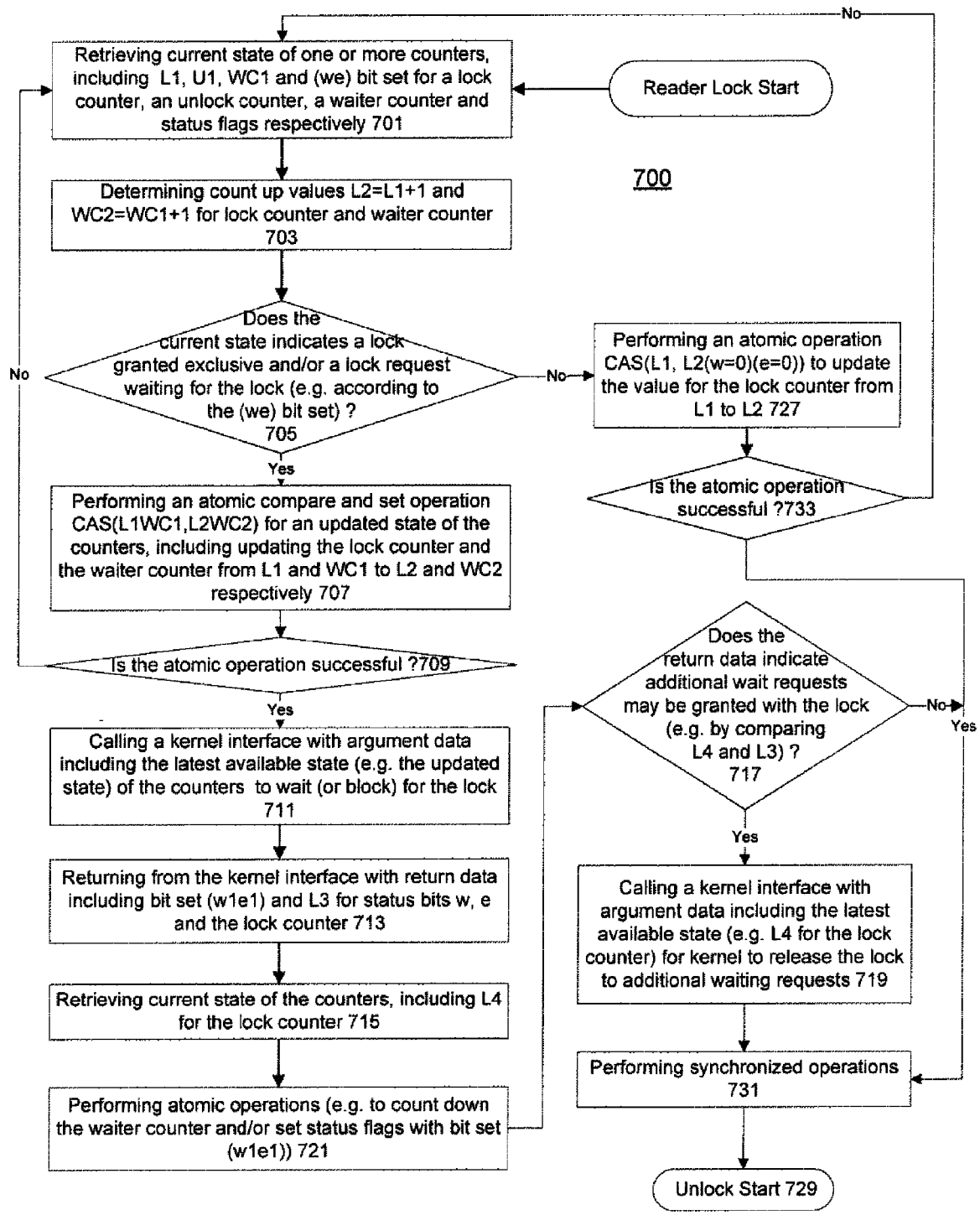
FIG. 7 is a flow diagram illustrating an embodiment of a process to update counters for requesting a lock as a reader to perform synchronized operations.

FIG. 7 is a flow diagram illustrating an embodiment of a process to update counters for requesting a lock as a reader to perform synchronized operations. Exemplary process 700 may be performed by a processing logic that may include hardware (circuitry, dedicated logic, etc.), software (such as is run on a dedicated machine), or a combination of both. For example, process 700 may be performed by system 100 of FIG. 1. Multiple threads or processes, e.g. task_1 111 of FIG. 1, may be granted with a lock as readers at the same time (i.e. the lock is not exclusively granted) to perform corresponding synchronization operations, e.g. reading a common file. In one embodiment, at block 701, the processing logic of process 700 retrieves a state or take a snapshot of one or more counters, including counts L1, U1, WC1 and a set of bits corresponding to a lock counter, an unlock counter, a waiter counter and status flags, such as counters L 203, U 207, WC 209 and status flags S 205 of FIG. 2.

Based on the state retrieved from the counter, at block 703, the processing logic of process 700 may determine updated values L2 and WC2 to count up counts L1 and WC1 by one for the lock and waiter counters. Updated counts of L2 and WC2 may indicate a newly arrived lock request. At block 705, the processing logic of process 700 may detect whether the lock is currently granted exclusively or if there is any lock request waiting for the lock as a writer. Typically, a thread or a process performing synchronization operations as a writer may require a lock granted exclusively, such as when writing to a common file accessed by multiple threads. In one embodiment, the bit set retrieved from the status flags include a w bit and an e bit indicating, when set as 1, respectively that the lock is exclusively granted and there is a lock request waiting as writer for the lock.

If both w and e bits are not set, at block 727, the processing logic of process 700 may perform an atomic operation CAS (L1(w=0)(e=0), L2) to update the lock counter from count L1 to count L2 conditioned on both w and e bits are not set. In one embodiment, atomic operation CAS(L1(w=0)(e=0), L2) cannot succeed if the specified conditions, e.g. the lock counter has a count as L1 and both w and e bits are not set, are not met at the time the atomic operation is applied. Usually, atomic operations such as CAS may be supported by underlying hardware, e.g. based on specific executable instructions for a processor. When the lock counter is successfully counted up, at block 733, the processing logic of process 700 may proceed to perform the corresponding synchronized operations with the lock granted as a reader at block 725. Otherwise, the processing logic of process may retrieve another state of the counters again repeating at block 701.

At block 707, if either the w bit or the e bit is set, indicating the lock is cannot be granted without waiting, the processing logic of process 700 may perform an atomic operation CAS (L1WC1, L2WC2) to update the lock counter and waiter counter from count L1 to count L2 and count WC1 to count WC2 respectively together to indicate an addition of a lock request waiting for the lock. Success of the atomic operation CAS(L1,WC1, L2WC2) may be conditioned on both the lock counter and the wait counter having not been updated (e.g. by other threads or processes) from count L1 and count WC2 at the time of the atomic operation. If the atomic operation is not successful at block 709, the processing logic of process 700 may return back to retrieving another state of the counters repeating at block 701.

Otherwise, if the atomic operation is successful, the processing logic of process 700 may proceed to wait for the lock at block 711. In one embodiment, the processing logic of process 700 calls a kernel interface, e.g. a programming interface function, to a kernel routine, e.g. stored in kernel 127 of FIG. 1, to block and wait for the lock. A kernel interface call may be associated with argument data including, for example, a lock identifier and/or a state of the counters, such as the up counted counts of the lock counter and/or the waiter counter. In some embodiments, the processing logic of process 700 may wake up (or return) from the kernel interface call by external interrupts (e.g. signaling a timer clock timing out). The processing logic of process 700 may continue waiting for the lock calling back the kernel interface if detecting a lock is not yet granted when returning from the kernel interface call (e.g. according to flag settings).

At block 713, in one embodiment, the processing logic of process 700 is granted with a lock returning from the kernel interface call with the return data including a bit set w1 and e1 for status bits w and e bits, and a lock count L3 for the lock counter. The processing logic of process 700 may proceed to retrieve a current state of the counters, for example, L4 for the lock counter, at block 715. Proceeding at block 721, in one embodiment, the processing logic of process 700 performs atomic operations to update the waiter counter and/or status flags. The processing logic of process 700 may count down (e.g. by one) the waiter counter based on CAS operation conditioned on the waiter count retrieved at the time together with L4 for the lock counter. In one embodiment, the processing logic of process 700 updates status flags with a bit set, e.g. (w1e1), for w and e bits according to the return data from the kernel interface call when waiting for the lock.

At block 717, the processing logic of process 700 may identify whether the return data from a kernel interface indicates a latest snapshot of the counters should be passed back to the kernel for releasing the lock (or unlocking) to additional waiting requests. For example, if lock count L3 (for the lock counter via the return data from a kernel interface call waiting for the lock) equals lock count L4 (for the lock counter retrieved from the counters after returning from the kernel interface call), there may not be additional waiting requests for the lock and the processing logic of process 700 may proceed to perform the synchronized operation at block 731. If the return data indicates the kernel should handle unlocking for additional waiting requests at block 717, the processing logic of process 700 may call a kernel interface with argument data including the latest available state (snapshot) of the counters, e.g. L4 for the lock counter, to handle unlocking additional waiting requests. The processing logic of process 700 may not block at the call to handle unlocking requests at block 719. The processing logic of process 700 may continue to release the lock at block 729 after completing the synchronized operation.

Exemplary Process to Synchronize a Writer

Figure 8:
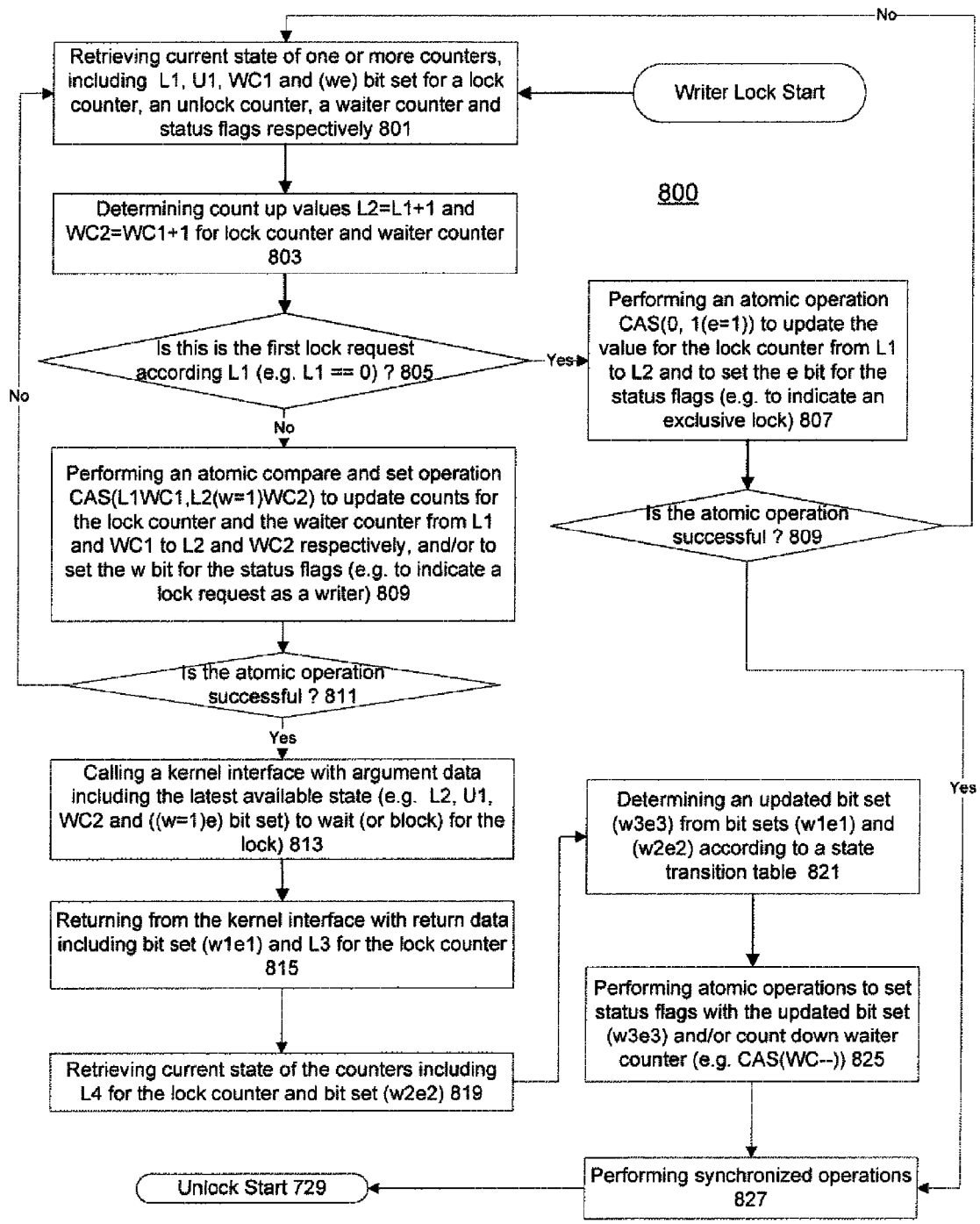
FIG. 8 is a flow diagram illustrating an embodiment of a process to update counters for requesting a lock as a writer to perform synchronized operations.

FIG. 8 is a flow diagram illustrating an embodiment of a process to update counters for requesting a lock as a writer to perform synchronized operations. Exemplary process 800 may be performed by a processing logic that may include hardware (circuitry, dedicated logic, etc.), software (such as is run on a dedicated machine), or a combination of both. For example, process 800 may be performed by system 100 of FIG. 1. Typically, only a single task (e.g. a thread or a process) may be granted a lock (e.g. exclusive lock) as a writer to perform corresponding synchronization operations at a time, e.g. writing to a file. In one embodiment, the processing logic of process 800 retrieves a state or take a snapshot of one or more counters, including counts L1, U1, WC1 and a set of bits for a lock counter, an unlock counter, a waiter counter and status flags at block 801, as similarly performed according to block 701 of FIG. 7.

Based on the state retrieved from the counter, at block 803, the processing logic of process 800 may determine updated counts L2 and WC2 to count up counts L1 and WC1 by one for the lock and waiter counters. If there is no request currently waiting for the lock, e.g. according to whether lock count L1 equals to 0 at block 805 and/or status bits w and e are both 0, the processing logic of process may mark the counters indicating the lock is now exclusively owned at block 807. In one embodiment, the processing logic of process 800 performs an atomic operation CAS(0,1(e=1)) to update the lock counter from 0 to 1 and set an e bit (exclusive bit) of the status flags of the counters. If the atomic operation is not successful at block 809 (e.g. the lock count has been counted up from 0 by new lock requests), the processing logic of process 800 may repeat taking another snapshot of the counters back to block 801. Otherwise, the processing logic of process 800 may proceed to perform the corresponding synchronized operations exclusively at block 827.

If there are already lock requests requesting for the lock at block 805, the processing logic of process 800 may update the counters atomically to register for the lock. For example, the processing logic of process 800 may perform an atomic operation CAS(L1WC1,L2WC2(w=1)) to update the lock counter and the waiter counter from L1 to L2, WC1 to WC2 and set the w bit of the status flag (e.g. indicating a lock request waiting for the lock as a writer) at block 811. If the counters are updated successfully by the atomic operation, at block 813, the processing logic of process 800 may proceed to wait for the lock at block 815. In one embodiment, the processing logic of process 800 calls a kernel interface to block and wait for the lock with an argument data including, for example, a lock identifier and/or the latest available state of the counters, such as L2 for the lock counter, U1 for the unlock counter, WC2 for the waiter counter and bit set ((w=1) e) for the status bits w and e of the status flags.

When an exclusive lock is granted, at block 817, the processing logic of process 800 may wake up (or return) from the kernel interface call with the return data including a bit set w1 and e1 for status bits w and e, and a lock count L3 for the lock counter. The processing logic of process 800 may proceed at block 819 to retrieve a current state of the counters, for example, L4 for the lock counter and bit set (w2e2) for status bits w and e of the status flags. Subsequently at block 821, the processing logic of process 800 may determine updated status flags including bit set (w3e3) for w and e status bits according to a state transition table. In one embodiment, a state transition table may be predetermined to generate a set of status bits from two sets of corresponding sets of status bits. For example, set bit set (w3e3) may be generated from bit set (w1e1) from the return data and bit set (w2e2) currently retrieved from the counters according to the state transition table.

The processing logic of process 800 may proceed, at block 825, to update the counters, for example, to count down the wait counter atomically and/or set (w3e3) for status bits w and e of the status flags. Subsequently, the processing logic of process 800 may perform the synchronized operations with an exclusive lock at block 827. In some embodiments, if the atomic operation to update the counters fails at block 825, e.g. the unlock counter and/or the status flags have been changed, the processing logic of process 800 may return back to wait for the lock at block 813. The processing logic of process 800 may continue to release the lock at block 729 after completing the synchronized operation.

Figure 9:
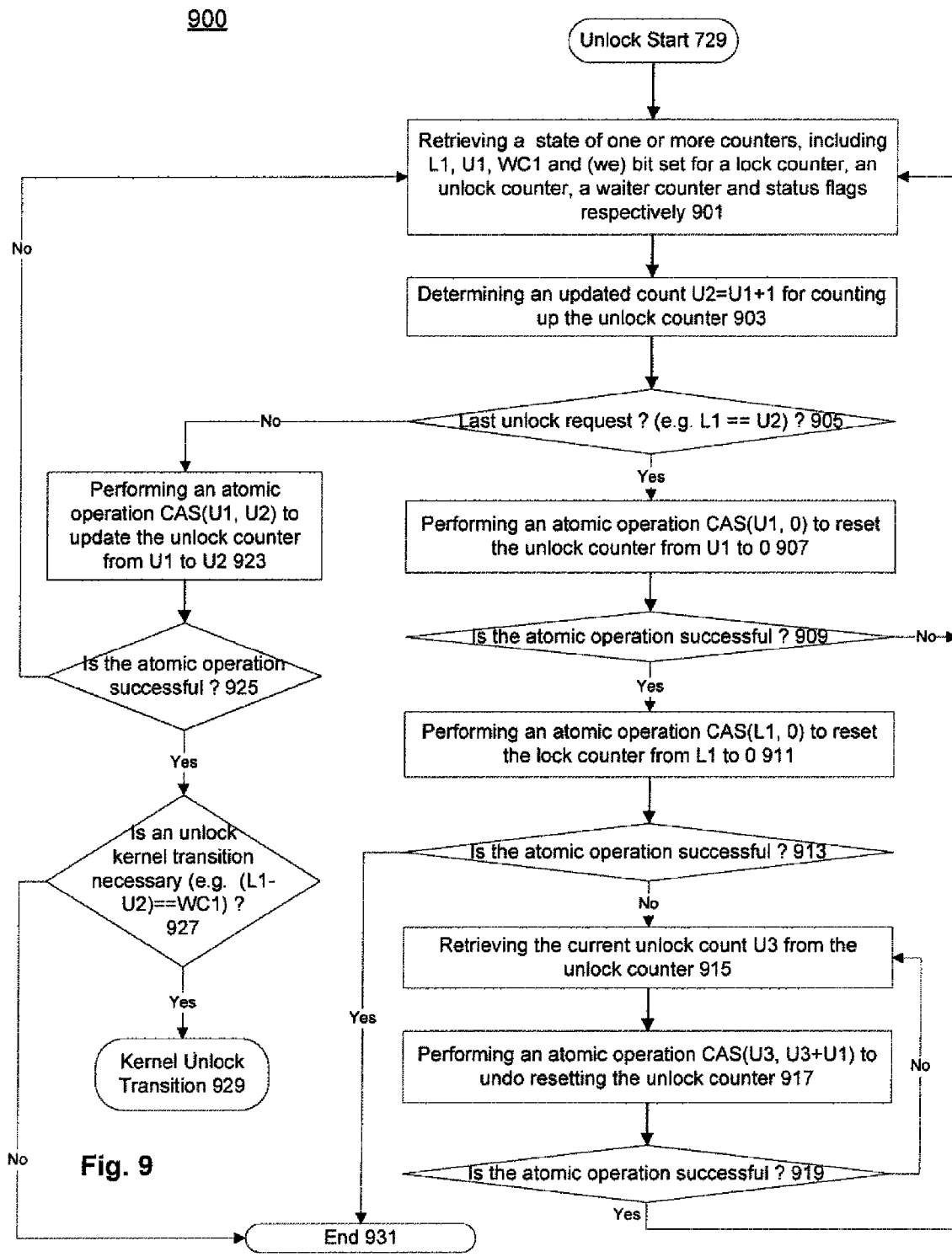
FIG. 9 is a flow diagram illustrating an embodiment of a process to update counters for releasing a lock after completing synchronized operations.

FIG. 9 is a flow diagram illustrating an embodiment of a process to update counters for releasing a lock after completing synchronized operations. Exemplary process 900 may be performed by a processing logic that may include hardware (circuitry, dedicated logic, etc.), software (such as is run on a dedicated machine), or a combination of both. For example, process 900 may be performed by system 100 of FIG. 1. In one embodiment, at block 901, the processing logic of process 900 retrieves a state of counters, for example, including counts L1, U1, WC1 for the lock counter, the unlock counter, the waiter counter and a bit set (we) for w and e bit flags of the status flags.

At block 903, the processing logic of process 900 may determine an update count U2=U1+1 to count up the unlock counter by one to indicate the arrival of an unlock request to release a lock after completing corresponding synchronized operations. The processing logic of process 900 may determine whether the present unlock request is the last one for the lock, for example, according to whether L1 equals U2 indicating there is no request waiting for the lock at block 905.

If the present unlock request is the last one, at block 907, the processing logic of process 900 may reset the counters. In one embodiment, the processing logic of process 900 resets the unlock counter from U1 to 0 according to an atomic operation CAS(U1, 0) at block 907. If resetting of the unlock request fails (e.g. the unlock count U1 has been changed), the processing logic of process 900 may abort resetting the counters to retrieve the state of the counters again returning back to block 901. Otherwise, if resetting the unlock counter is successful at block 909, the processing logic of process 900 may proceed to reset the lock counter at block 911, for example, according to an atomic operation CAS(L1, 0) to update the lock counter from L1 to 0. If the atomic operation is successful at block 913, the processing logic of process 900 may retrieve the current state of the counters again returning back to block 901.

Otherwise, if resetting the lock counter fails, at block 913, the processing logic of process 900 may undo the resetting of the unlock counter. For example, in one embodiment, the processing logic of process 900 retrieves count U3 from the unlock counter at block 915. Subsequently at block 917, the processing logic of process 900 may undo the resetting of the unlock counter by updating the unlock counter from U3 to (U3+U1) according to atomic operation CAS(U3,U3+U1). The processing logic of process 900 may repeatedly trying to undo the resetting of the unlock counter at blocks 915 and 917, if the update of the unlock counter fails at block 919. Otherwise, if successful, releasing the lock is completed at block 931.

If there are lock requests waiting for the lock, at block 905, in one embodiment, the processing logic of process 900 updates the counters by counting up the unlock counter from U1 to U2 atomically according to operation CAS(U1,U2) at block 923. If counting up the unlock counter fails, at block 925, the processing logic of process 900 may retrieve the current state of the counters again returning back to block 901. Otherwise, if counting up the unlock counter is successful, in on embodiment, the processing logic of process 900 determines at block 927 whether to call a kernel interface for unlock kernel transition, e.g. based on whether wait count WC1 equals the difference between lock count L1 and updated unlock count U2. If there is no need for kernel unlock transition, the processing logic of process 900 may complete releasing the lock at block 931. Otherwise, the processing logic of process 900 may proceed at kernel unlock transition to release the lock at block 929.

Figure 10:
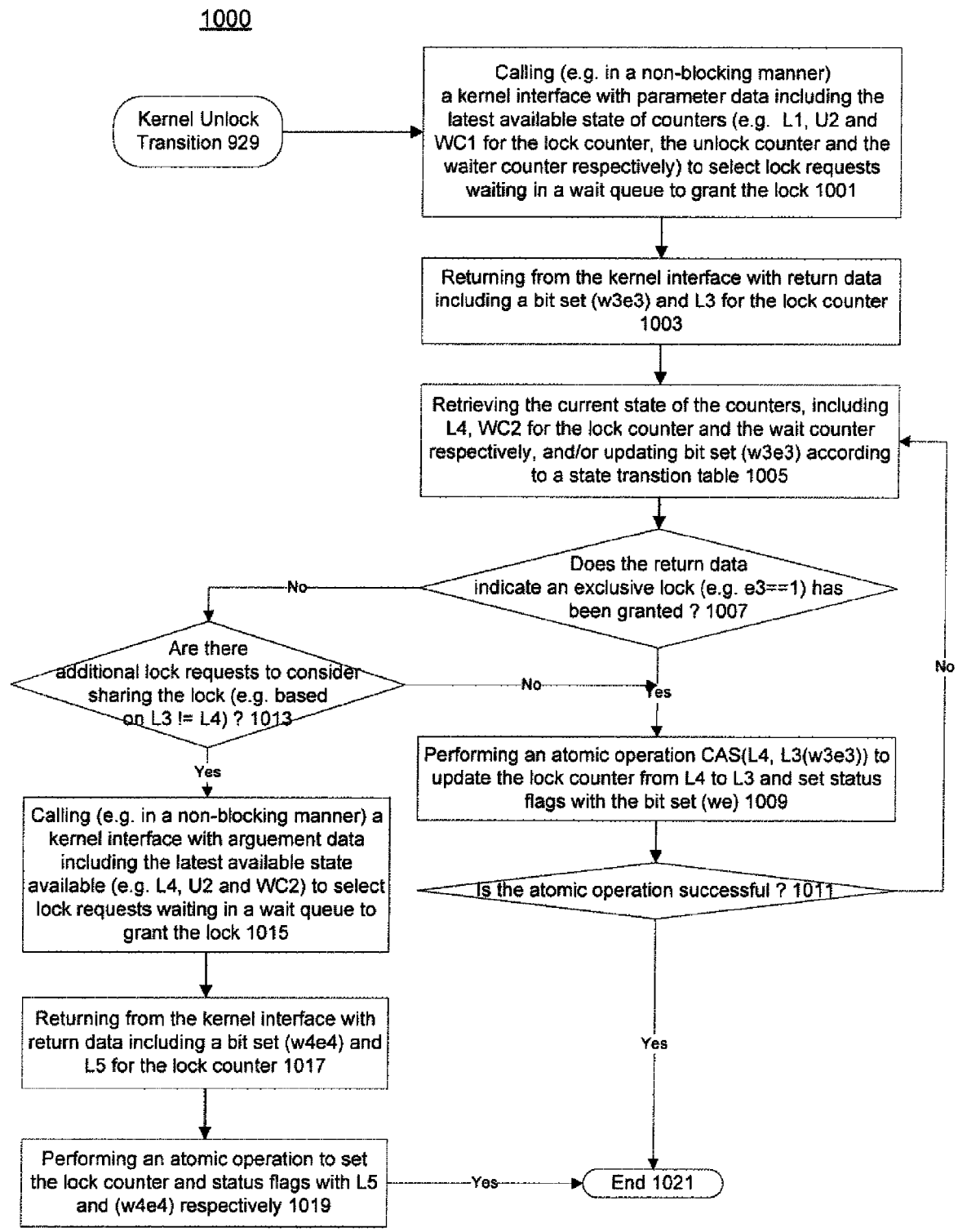
FIG. 10 is a flow diagram illustrating an embodiment of a process to call kernel interfaces with states of counters for releasing a lock after completing synchronized operations.

FIG. 10 is a flow diagram illustrating an embodiment of a process to call kernel interfaces with states of counters for releasing a lock after completing synchronized operations. Exemplary process 1000 may be performed by a processing logic that may include hardware (circuitry, dedicated logic, etc.), software (such as is run on a dedicated machine), or a combination of both. For example, process 1000 may be performed by system 100 of FIG. 1. In one embodiment, at block 1001, the processing logic of process 1000 calls a kernel interface passing argument data to grant the lock to selected lock requests waiting for the lock. The argument data may include the lock identifier and/or the latest available state of the counters based on the latest retrieval and/or update of the counters, such as L1, U2, and WC1 for the lock counter, the unlock counter and the waiter counter of FIG. 9. In one embodiment, the kernel interface call at block 1001 is non-blocking, e.g. without waiting for user level events or user level actions for an unbounded period of time.

When returning from the kernel at block 1003, the return data may include a bit set (w3e3) for w and e status bits of the status flags and L3 for the lock counter. At block 1005, the processing logic of process 1000 may retrieve a current state of the counters including, for example, L4 and WC2 for the lock counter and the waiter counter. In some embodiment, the processing logic of process 1000 updates bit set (w3e3) according to a predetermined state transition table based on the current state. If status bit e from the return data indicates an exclusive lock has been granted to a lock request (e.g. e is set with value e3=1) at block 1007, the processing logic of process 1000 may update the lock counter from L4 to L3 and set the status flags with bit set (w3e3) for the w and e status bits according to an atomic operation CAS(L4, L3(w3e3)) at block 1009. If the atomic operation fails, at block 1011, the processing logic of process 1000 may retrieve again the current state of the counters back at block 1005. Otherwise, the processing logic of process 1000 may conclude the kernel unlock transition at block 1021.

If the lock is not exclusively granted at block 1007, the processing logic of process 1000 may determine whether there are additional lock requests to consider for sharing the lock at block 1013. In one embodiment, if lock count L3 from the return data of the kernel interface call and lock count L4 of the lock counter retrieved are not equal, additional lock requests may share the lock. If there is no additional lock request to consider at block 1013, the processing logic of process 1000 may update the counters at block 1009. Otherwise, the processing logic of process 1000 may call another kernel interface (e.g. a non-blocking call) passing argument data including the latest available state of the counters to consider additional lock requests to share the lock at block

1015. In one embodiment, the argument data includes L4, U2, and WC2 for the lock counter, the unlock counter and the waiter counter respectively. The processing logic of process 1000 may generate, according to a predetermined transition table, a bit set for w and e status bits for the argument data based on bit set (w3e3) and a corresponding bit set of the current state of the counters retrieved as in block 1005.

After returning back from the kernel interface call with return data at block 1017, the processing logic of process 1000 may update the counters according to the return data at block 1019 to complete the kernel unlock transition at block 1021. In one embodiment, the return data includes L5 for the lock counter and bit set (w4e4) for status bit w and e of the status flags. The processing logic of process 1000 may update the counters atomically from the latest state available, e.g. including L4 for the lock counter, to L5 and (w4e4) for the lock counter and status bits w and e to release the lock.

Exemplary Kernel Process to Block a Synchronization Request

Figure 11:
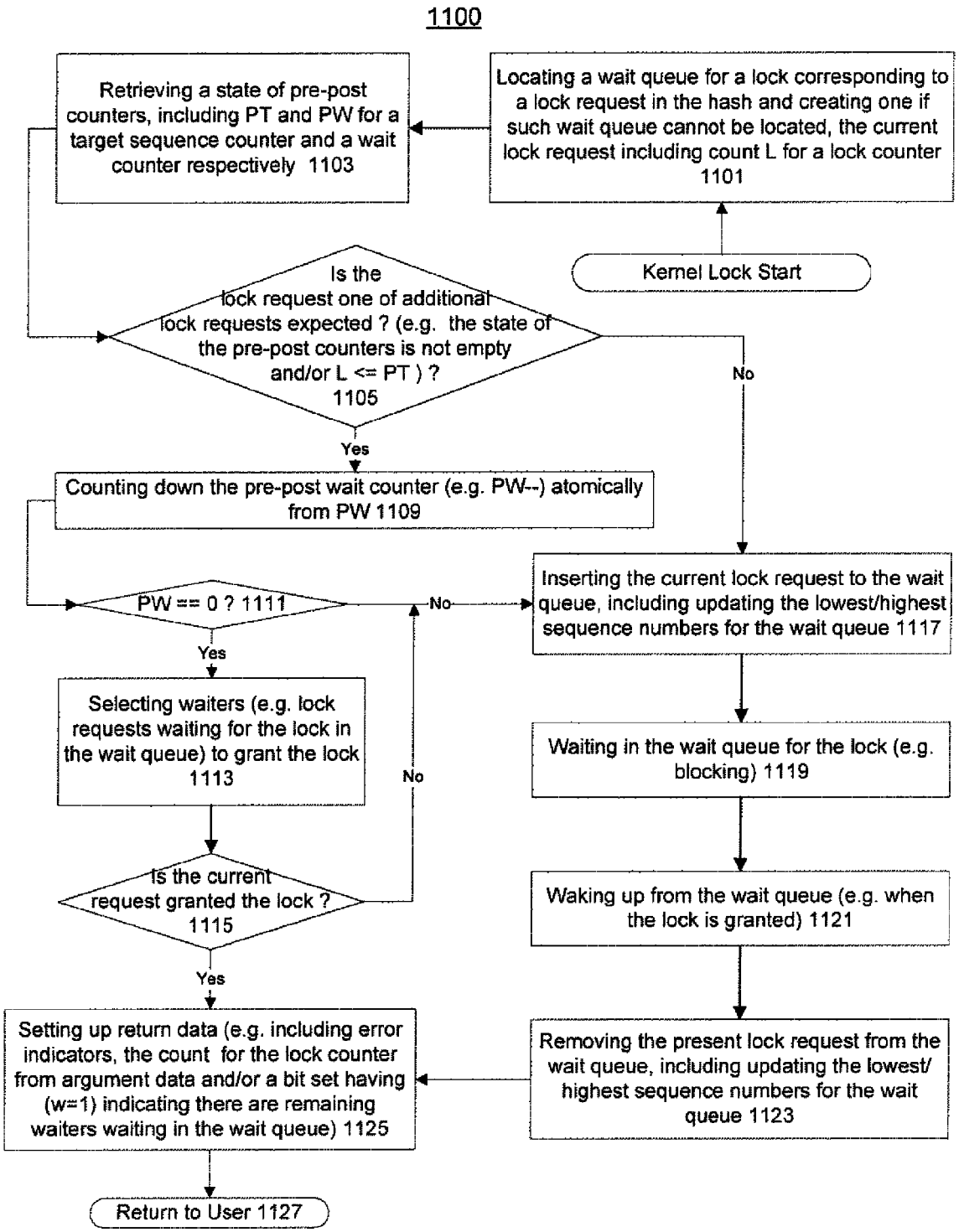
FIG. 11 is a flow diagram illustrating an embodiment of a process to schedule a request for a lock in a wait queue according to counters.

FIG. 11 is a flow diagram illustrating an embodiment of a process to schedule a request for a lock in a wait queue according to counters. Exemplary process 1100 may be performed by a processing logic that may include hardware (circuitry, dedicated logic, etc.), software (such as is run on a dedicated machine), or a combination of both. For example, process 1100 may be performed by kernel 127 of FIG. 1. Process 1100 for kernel lock may correspond to a kernel interface call such as at block 711 of FIG. 7 and/or block 813 of FIG. 8. In one embodiment, at block 1101, the processing logic of process 1100 locates a wait queue for a lock request in a hash memory. A lock request may identify a lock via an identifier allocated for synchronizing a group of tasks. In one embodiment, a lock request includes an argument data with a lock identifier. If the wait queue for the lock cannot be located, the processing logic of process 1100 may create a wait queue for the lock.

At block 1103, in one embodiment, the processing logic of process 1100 retrieves a state of pre-post counters, such as counters 137 of FIG. 1. The state of pre-post counters may include counts PT and PW for a target sequence counter and a wait counter respectively. At block 1105, the processing logic of process 1100 may determine if the lock request is an additional lock request expected. For example, if the state of pre-post counters is non-empty, the processing logic of process 1100 may compare a lock count L passed via the argument data with count PT for the target sequence counter at block. Lock count L may indicate a sequence number associated with the lock request. If lock count L for the lock request is less than or equal to target sequence count PT, the present lock request may be identified as one of additional lock requests expected. The processing logic of process 1100 may count down (e.g. atomically) the pre-post wait counter (e.g. CAS(PW,(PW−1)) for an additional lock request expected. The processing logic of process 1100 may retrieve the state of the pre-post counters again back at block 1103 if the atomic operation to count down the pre-post wait counter fails.

If the updated wait counter is cleared with count 0 at block 1111, indicating all additional lock requests expected have arrived, the processing logic of process 1100 may select waiters or lock requests waiting for the lock in the wait queue to grant the lock at block 1113. Each waiter selected may be waken up and de-queued from the wait queue to perform corresponding synchronized operations. At bock 1115, the processing logic of process 1100 may determine if the present lock request can be granted with the lock. For example, a lock request as a reader may share a lock already granted to other lock requests. If a lock is granted, the processing logic of process 1100 may set up return data at block 1125 to return to a user at block 1127, such as synchronization library 117 of FIG. 1. In one embodiment, return data may include error indicators identifying occurrences of errors, if there is any, and/or a lock count for a lock counter according to argument data received. The return data may include a bit set with w bit flag set to 1 to indicate, for example, there are remaining waiters waiting in the wait queue as writers.

If the present lock request is not an additional lock request expected at block 1105 and/or if there are more additional lock requests expected (e.g. the updated wait counter is not empty) at block 1111, in one embodiment, the processing logic of process 1100 inserts the lock request to the wait queue at block 1117. A sequence number may be assigned to the lock request waiting in the wait queue according to the lock count L. In one embodiment, the processing logic of process 1100 may update a number of characteristic data associated with the wait queue, such as the highest and lowest number of sequence numbers in the wait queue.

Subsequently, at block 1119, the processing logic of process may wait (or block) in the wait queue waiting for the lock. When the lock is granted, the processing logic of process 1100 may wake up from the wait queue at block 1121. In certain embodiments, the processing logic of process 1100 may wake up responding to an error condition such as caused by an external interrupts. The processing logic of process 1100 may return back to wait in the wait queue at block 1119 if an error condition is identified when waking up at block 1121. In one embodiment, the processing logic of process 1100 removes the present lock request from the wait queue and update characteristics data of the wait queue accordingly at block 1123. In one embodiment, a wait queue may be associated with characteristic data include, for example, the highest sequence number, the lowest sequence number, or the number of requests currently waiting in the wait queue. The processing logic of process 1100 may proceed to set up return data at block 1125 to return to user at block 1127.

Exemplary Kernel Process to Grant a Synchronization Request

Figure 12:
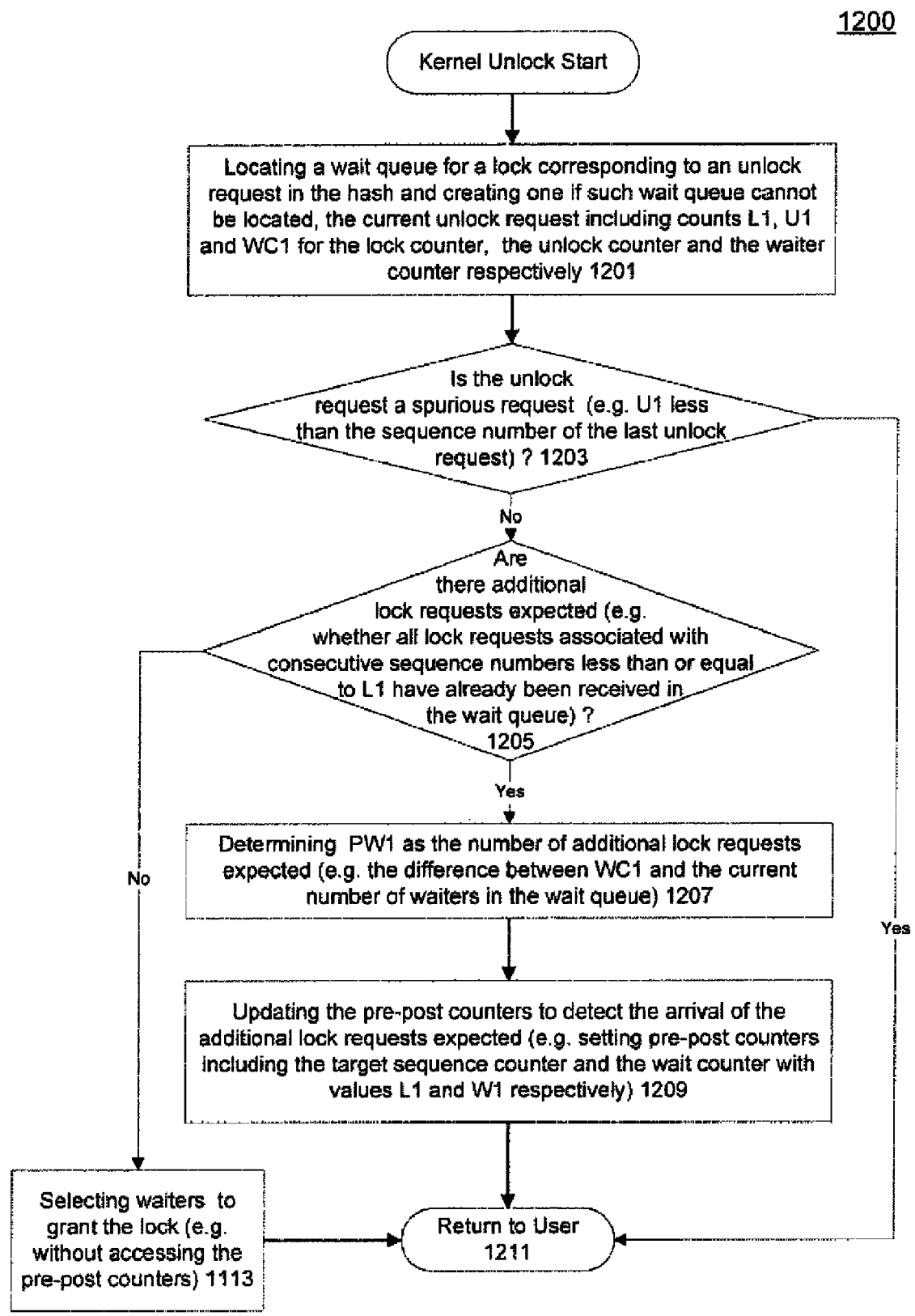
FIG. 12 is a flow diagram illustrating an embodiment of a process to grant a lock to requests selected from a wait queue according to counters.

FIG. 12 is a flow diagram illustrating an embodiment of a process to grant a lock to requests selected from a wait queue according to counters. Exemplary process 1200 may be performed by a processing logic that may include hardware (circuitry, dedicated logic, etc.), software (such as is run on a dedicated machine), or a combination of both. For example, process 1200 may be performed by kernel 127 of FIG. 1. Process 1200 for kernel unlock may correspond to a kernel interface call such as at block 1001 of FIG. 10. In one embodiment, at block 1201, the processing logic of process 1200 locates a wait queue in a hash for a lock corresponding an unlock request which may identify the lock via an identifier included in the unlock request or a kernel interface call. A lock request may include counts L1, U1 and WC1 respectively for a lock counter, an unlock counter and a waiter counter, such as in synchronization counters 103 of FIG. 1. If the wait queue for the lock cannot be located, the processing logic of process 1200 may create a wait queue for the lock.

At block 1203, the processing logic of process 1200 may compare a last unlock sequence number and count U1 from the lock request to detect whether the lock request is a spurious request, e.g. a lock request erroneously generated. The last unlock sequence number may be the sequence number of the unlock counter when the most recent or last successful unlock operation is granted. If the last unlock sequence number is greater than count U1, the processing logic may ignore the present lock request as a spurious one and return to a user 1211, e.g. synchronization library 117 of FIG. 1.

Otherwise, if the lock request is not a spurious request, the processing logic of process 1200 may determine if there are additional lock requests to expect at block 1205. In one embodiment, the processing logic of process 1200 identifies from the wait queue waiting lock requests having sequence numbers less than or equal to count L1. If all the sequence numbers identified are consecutively less then or equal to L1 (e.g. L1-1, L1-2 . . . ), there may be no additional lock requests expected. The processing logic of process 1200 may proceed to select waiters from the wait queue to grant the lock at block 1113. Otherwise, at block 1207, if there are additional lock requests expected, the processing logic of process 1200 may determine PW1 as the number of additional lock requests expected. In One embodiment, PW1 is determined according to the difference between the waiter count WC1 of the lock request and the current number of waiters waiting in the wait queue. The processing logic of process 1200 may update the pre-post counters at block 1209 to assign L1 and PW1 respectively to the target sequence counter and the wait counter.

Figure 13:
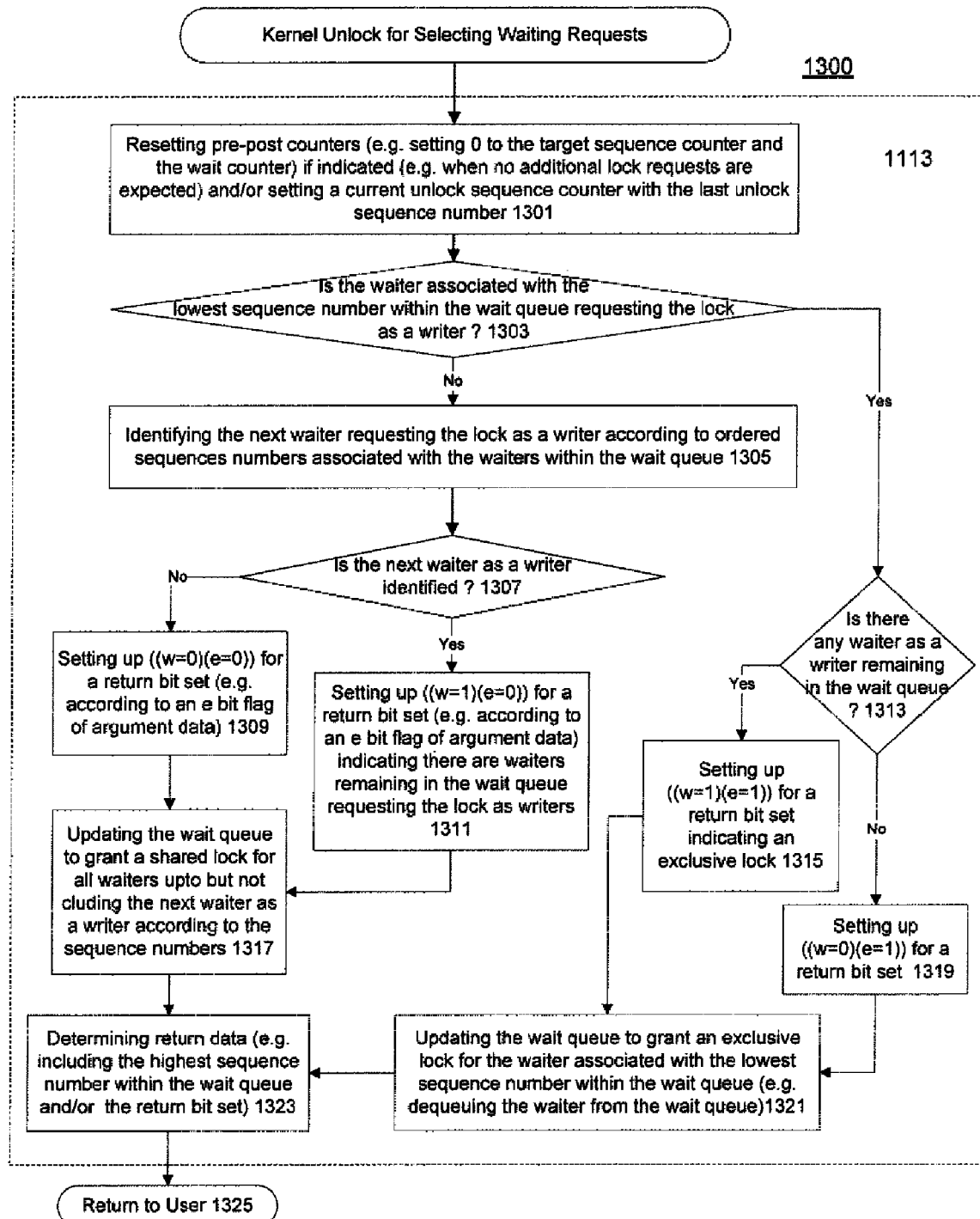
FIG. 13 is a flow diagram illustrating an embodiment of a process to select requests from a wait queue according to sequence numbers.

FIG. 13 is a flow diagram illustrating an embodiment of a process to select requests from a wait queue according to sequence numbers. Exemplary process 1300 may be performed by a processing logic that may include hardware (circuitry, dedicated logic, etc.), software (such as is run on a dedicated machine), or a combination of both. For example, process 1300 may be performed by kernel 127 of FIG. 1. Process 1300 for kernel unlock may include block 1113 of FIG. 11 and/or correspond to a kernel interface call such as at block 729 of FIG. 7. At block 1301, in one embodiment, the processing logic of process 1300 resets the pre-post counters if indicated, e.g. based on the wait counter of the pre-post counters. When no more additional lock requests are expected, the processing logic of process 1300 may reset the pre-post counters. In some embodiments, argument data from a kernel interface call may indicate whether there is a need to reset the pre-post counters. Resetting pre-post counters may update each pre-post counter with count 0. A current unlock sequence counter may be set to the last unlock sequence number.

At block 1303, in one embodiment, the processing logic of process 1300 determines if a selected waiter associated with the lowest sequence number in the wait queue is requesting the lock as a writer. If the selected lock request (e.g. to grant the lock) is a writer, the processing logic of process 1300 determines if there is any other waiter in the wait queue requesting the lock as a writer at block 1313. The processing logic of process 1300 may setup a return bit set (11) for status bits w and e at block 1315 if there is any remaining waiting lock request as writer and, otherwise, the return bit set (01) for status bits w and e at block 1319. In one embodiment, status bit w is set (e.g. of value 1) to indicate there is lock request waiting in the wait queue as writer and status bit e is set if the lock is granted exclusively (e.g. to a lock request as writer). At block 1321, the processing logic of process may update the wait queue according to the selected writer. For example, characteristic data such as the lowest sequence number associated with the wait queue may be updated. A thread associated with the selected waiter may be woken up carrying updated status bits back to the user space or user land. The selected waiter may be dequeued from the wait queue.

If a selected waiter associated with the lowest sequence number in the wait queue is not a writer at block 1303, the processing logic of process 1300 may identify the lowest sequence number associated with a writer within the wait queue at block 1305. If the next writer is identified at block 1307, the processing logic of process 1300 may setup a return bit set at block 1311, e.g. setting status bit w as 1 and status bit e as 0 indicating there are waiters remaining in the wait queue requesting the lock as writers. The return bit set may include status bit e as 0 indicating granting a shared lock. Otherwise, if no writer is identified in the wait queue, the processing logic of process 1300 may setup a return bit set at block 1309, e.g. setting status bits w and e to 0. Subsequently, the processing logic of process 1300 may update the wait queue to grant the lock as a shared lock to all waiters with sequence numbers up to (e.g. not including) the next writer (e.g. dequeing all the waiters granted with the shared lock from the wait queue) at block 1317. The processing logic of process 1300 may determine return data, e.g. including the return bit set at block 1323 to return to user 1325. The return data may include the highest sequence number of the wait queue.

Figure 14:
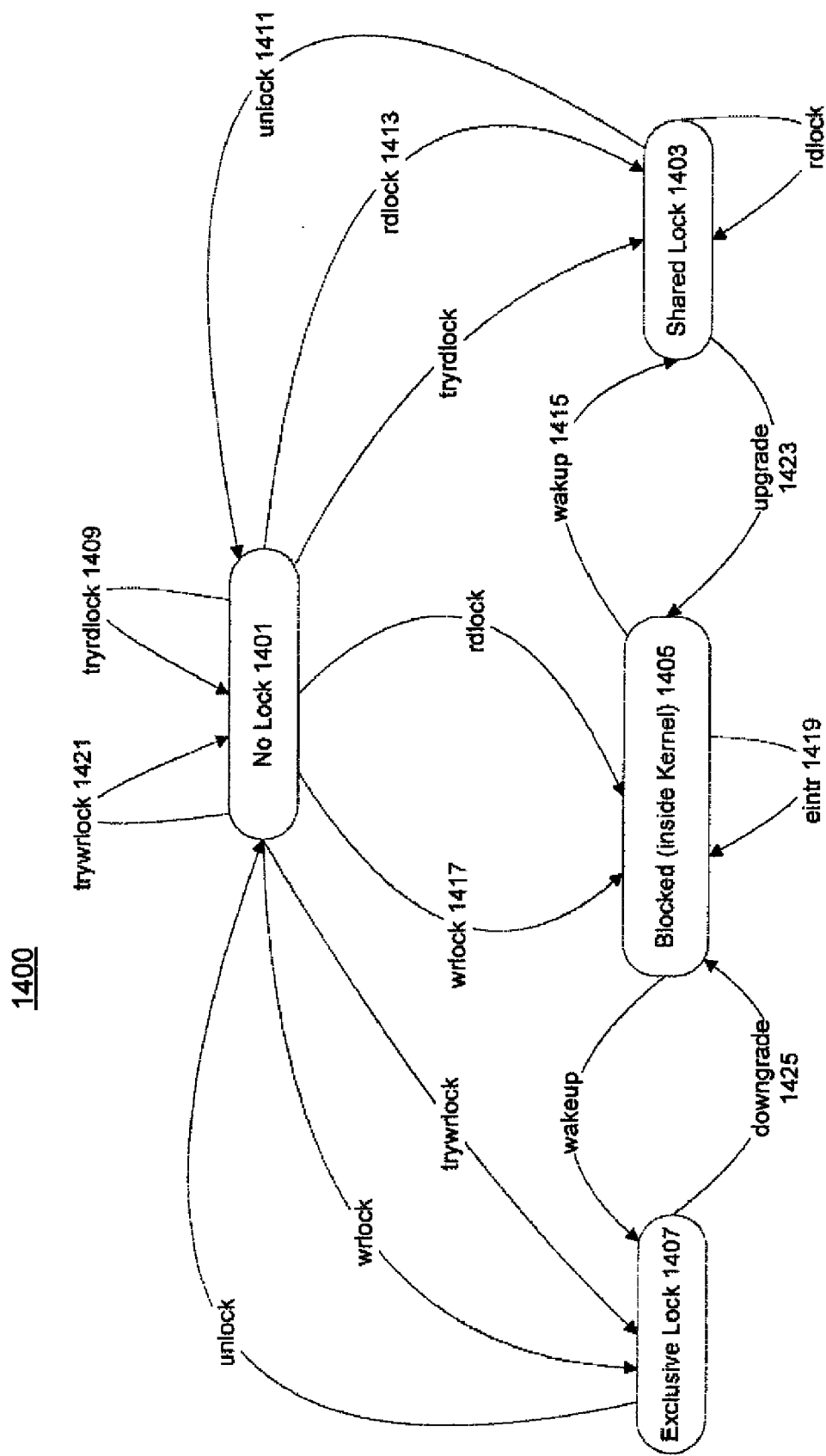
FIG. 14 is a state diagram indicating state transitions for a task to perform synchronized operations according to one embodiment of present invention.

FIG. 14 is a state diagram indicating state transitions for a task to perform synchronized operations according to one embodiment of present invention. A task may be one or more threads and/or processes, such as task_1 111 . . . task_w_k 139 of FIG. 1. Typically, a task requests a lock via APIs, such as provided via synchronization library 117 of Figure to coordinate with other tasks for performing corresponding synchronized operations. For example, from a no lock state 1401, the task may call API trywrlock 1421 to request a lock as a writer. If the lock for a writer is successfully granted, the task may transition to an exclusive lock state 1407 to perform synchronized operation exclusively as the only task granted with the lock. If the call with API trywrlock 1421 fails, the task may remain at the no lock state 1401. In one embodiment, the task calls API tryrdlock 1409 to request a lock as a reader. If successfully granted with the lock, the task may transition to a shared lock state 1403 to perform synchronized operation sharing the lock with other tasks. If the call with API tryrdlock 1409 fails, the task may remain at no lock state 1401.

In one embodiment, from the no lock state 1401, the task may call API wrlock 1417 to request a lock as a writer. If the lock is not available, the task may transition to a blocked state 1405 to wait for the lock (e.g. blocking). If a lock is available for API wrlock, e.g. when the lock is free and no other tasks are currently waiting, the task may transition to the exclusive lock state 1407 to perform synchronized operation exclusively as a writer. In one embodiment, the task calls API rdlock 1413 to request a lock as a reader. If successfully granted with the lock, the task may transition to the shared lock state 1403 to perform synchronized operation sharing the lock with other tasks. Otherwise, if the lock is not available, e.g. already granted exclusively for another task, the task may transition to the blocked state 1405 waiting for the lock (e.g. blocking).

In one embodiment, from the exclusive lock state 1407, the task downgrades an exclusive lock granted to a shared lock. For example, the task may call API downgrade 1425 (e.g. pthread_rwlock_downgrade_np( )) transitioning from the exclusive lock sate 1407 to the blocked sate 1405 to wake up other shared lock waiters who might be granted a shared lock along with the task (or thread). The task may drop the exclusive lock state 1407 block waiting in the blocked state 1405 for acquiring the lock as a shared lock along with other eligible tasks (or threads). When the lock is available as a shared lock, the task may wake up to call API wakeup 1415 to transition to the shared lock state 1403. A task holding an exclusive lock may prevent others from modifying the data related to the lock. While downgrading, a task may not lose the lock as long as the lock is held as a shared lock (e.g. by preventing others from modifying the data related to the lock). In some embodiments, a task calls API unlock to release the exclusively owned lock transitioning from the exclusive lock state 1407 to the no lock state 1401.

Likewise, from the shared lock state 1403, the task may call API unlock 1411 transitioning back to the no lock state 1401 to release the shared lock. The task may upgrade a shared lock granted to an exclusive lock. For example, the task may call API upgrade 1423 from the shared lock state 1403 to block waiting in the blocked state 1405 for other tasks holding the shared lock to unlock. Once all others drop (or release) the shared lock, the task may be granted with an exclusive lock. While waiting for others to unlock the shared lock at block 1405, the task may not give up the shared lock and no waiters other than the task may modify the data related to the lock. A task requesting upgrading may have precedence over other waiting writers. In some embodiments, from a blocked state 1405, a task may receive external interrupt eintr 1419, e.g. according to a timer timing out, and go back to the blocked state 1405 waiting for a lock.

FIG. 15 is an example of a state transition table for updating status flags for counters according to one embodiment of present invention. Updating synchronization counters, such as counters 127 including status bits w and e for status flags 109 of FIG. 1, may be based on a predetermined state transition table such as state transition table 1500, e.g. according to the processing logic of process 8 at block 821 and/or the processing logic of process 10 at block 1005. In one embodiment, state transition table 1500 includes columns 1501 and rows 1503 corresponding to possible settings of status bits from different sources, for example, received from return value of a kernel interface call 1501 or retrieved from status flags of synchronization counters 1503. In one embodiment, W 1509, E 1511 and WE 1513 indicate bit sets (10), (01) and (11) for w and e status bits from return value of an interface call. Decision actions according to transition table 1500 may include T 1505 and/or X 1507. For example, if status bit w is set and status bit e is not set, both in return value from a kernel interface call and in the currently retrieved status flags, an update bit set is generated for T 1505. On the other hand, if status bit w is set and status bit e is not set in return value of a kernel interface call, while status bit w is not set and status bit e is set in the currently retrieved status flags of synchronization counters, an error condition is detected for X 1507.

FIG. 16 is a sequence diagram illustrating example sequences to synchronize reader and writer lock requests using counters according to one embodiment of the present invention. Sequence 1600 may be based on synchronization counters synchronizing a plurality of tasks such as synchronization counters 103 of FIG. 1. In one embodiment, sequence 1600 includes rows corresponding to a time instance of synchronization sequences for a lock, as indicated via column 1601. The lock may be granted according to an order illustrated in column 1603 for sequence 1600. Each time instance may correspond to an operation described according to column 1605 of sequence 1600. Column 1607 may indicate a status of a kernel interface call, such as accessing kernel resources at sequence 7 1623, returning from kernel at sequence 8 1625 or returning without accessing kernel resources at sequence 1 1619. A kernel interface call may carry along a state (or a snapshot) of the counters at the user level. States of counters may include lock counts including settings for status bits w and e, unlock counts and waiter counts, as indicated in columns 1609, 1611 and 1613. Ordered list of requests waiting in the wait queue for each sequence of time instances may be illustrated according to column 1617. Column 1615 may indicate interfaces with the wait queue.

For example, at sequence 1 1619, a lock request RL1 is received from a reader as a first lock request for a lock. The request RL1 is granted with the lock without calling a kernel interface with a lock count counted up by 1. At sequence 2 1621, a lock request WL2 arrives to request the lock as a writer calling the kernel interface to block waiting in the wait queue. The lock request WL2 is associated with a sequence number 2 corresponding to the lock count counted up from 1 to 2 at sequence 2 1621, while the wait counter is counted atomically together with the lock counter to 1 and status bit w is set to indicate a waiter is in queue waiting for the lock as a writer. A count W2 for the lock counter may correspond to a lock counter with lock count 2 with w status bit set to 1.

At sequence 7 1623, the reader releases the lock with a first unlock request UL1 to up count the unlock counter from 0 to 1 while updating neither the lock counter nor the waiter counter. In one embodiment, an indication to reset both the lock counter and unlock counter is based on a condition that the lock counter are equal to the unlock counter. In response to the unlock request UL1, a kernel interface is called to select waiters to grant the lock, such as next waiting request WL2. On the way back from the kernel interface call, at sequence 8 1625, status bit e is set to indicate the lock has been granted exclusively (e.g. based on return value of the interface call) according to the unlock count 6WE. Two requests for a lock as readers may be granted with the shared lock in sequences 12 and 13 1627. When a task is waken up from waiting in a wait queue returning from a kernel interface call, the wait counter may be counted down atomically to indicate a change of the number of waiters waiting in the wait queue. When there is no waiters waiting in the wait queue, at sequence 22 1631, an unlock request to release the lock may reset both the lock and unlock counters atomically returning back from a kernel interface call, absent from additional intervening lock requests.

Figure 17A:
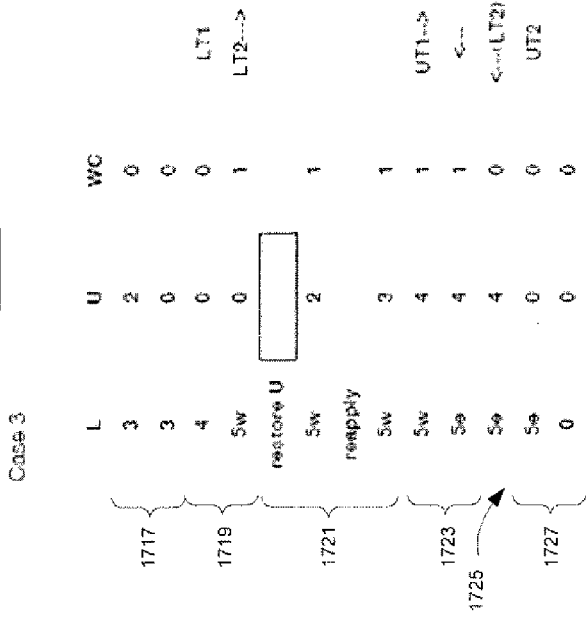
FIGS. 17A-17C are sequence diagrams illustrating examples of synchronizing lock requests under race conditions using counters.
Figure 17B:
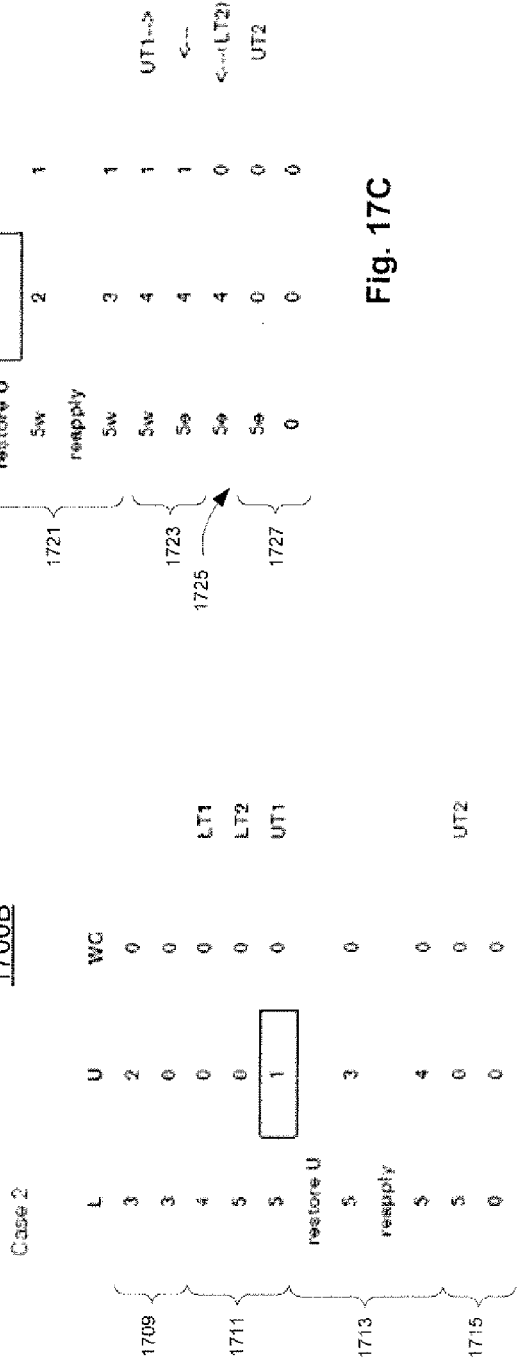
Figure 17C:
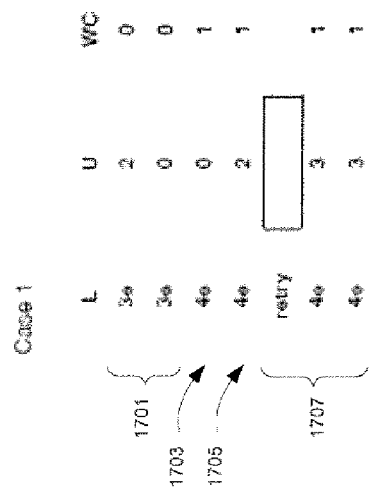

FIGS. 17A-17C are sequence diagrams illustrating examples of synchronizing lock requests under race conditions using counters. Sequences 1700A-1700C may be based on synchronization counters, such as counters 103 of FIG. 1, to synchronize a plurality of tasks. For example, sequences 1700A illustrate an unlock request restores a portion of atomic operations to reset counters because of intervening arrival of new lock requests. During sequences 1701, in one embodiment, the unlock request performs a first atomic operation to reset an unlock counter U based on a current state of counters, e.g. including counts 3e, 2 and 0 for a lock counter L, an unlock counter U and a waiter counter WC, such as according to processing logic 900 of FIG. 9. Subsequently at sequence 1703, a lock request arrives prior to completing atomic resetting operation for the lock counter L. As a result, at sequence 1705, the unlock request restores the unlock counter back and completes unlock operations during sequences 1707.

Sequences 1700B demonstrate multiple lock requests interfere with an unlock request attempting to reset synchronization counters. During sequences 1709, in one embodiment, the unlock request performs an atomic operation to reset the unlock counter U. Subsequently during sequences 1711, prior to another atomic operation to reset the lock counter L via the unlock request, a first lock request and a second lock request arrive to request the lock as a shared lock (e.g. as a reader). Both lock requests are granted with the lock. A first unlock request corresponding to the first lock request arrives prior to the unlock request completing an atomic operation resetting the lock counter L. As a result, during sequences 1713, the unlock request restores the unlock counter and completes unlocking operations to count up the unlock counter U. When a second unlock request corresponding to the second lock request arrives, during sequences 1715, counters L and U are reset accordingly.

Sequences 1700C illustrate multiple lock requests including a writer request interfere with an unlock request attempting to reset synchronization counters. During sequences 1717, in one embodiment, the unlock request performs an atomic operation to reset the unlock counter U. Subsequently during sequences 1719, prior to another atomic operation to reset the lock counter L via the unlock request, a first lock request as a reader and a second lock request as a writer arrive to request the lock. The first lock request is granted with the lock while the second lock request waits in a wait queue with status bit w and the waiter count updated accordingly. As a result, during sequences 1721, the unlock request restores the unlock counter and completes unlocking operations to count up the unlock counter U. During sequences 1723, a first unlock request corresponding to the first lock request arrives to release the lock for granting exclusively to the second lock request. Status bit e and the waiter counter WC are updated accordingly. The second lock request arriving during sequences 1719 returns at sequence 1725. When a second unlock request corresponding to the second lock request arrives, during sequences 1727, counters L and U are reset accordingly.

Figure 18C:
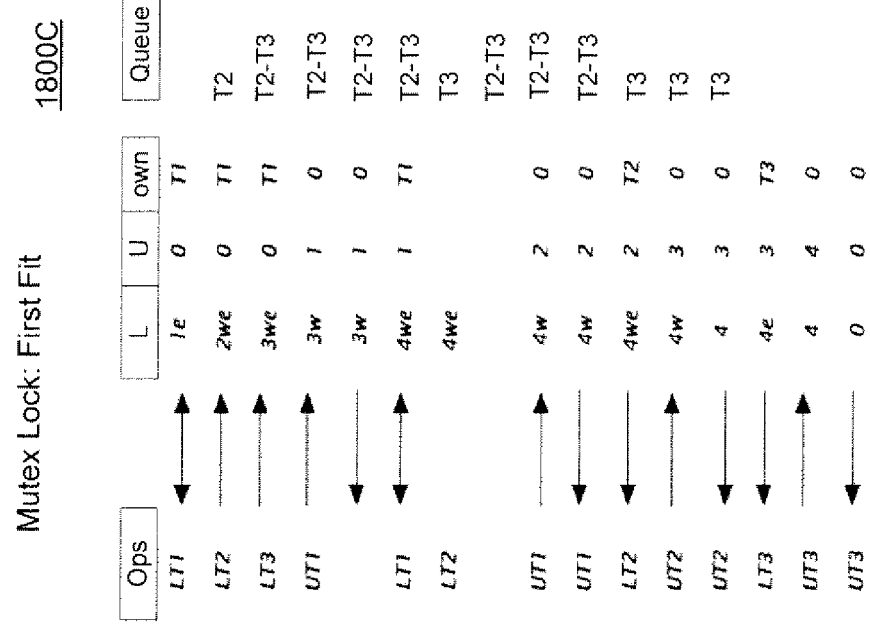
Figure 18A:
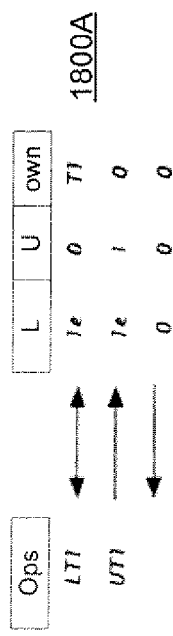
Figure 18B:
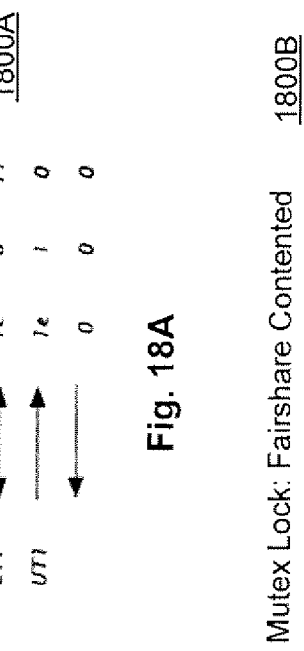

FIGS. 18-19 are sequence diagrams illustrating different variations of synchronization schemes based on counters according to one embodiment of the present invention. Sequences 1800A-1900C may be based on synchronization counters synchronizing a plurality of tasks such as counters 103 of FIG. 1. In one embodiment, sequences 1800A are based on synchronization counters supporting an uncontended (or first fit) mutex lock scheme, sequences 1800B are based on synchronization counters supporting a fairshare contended mutex lock scheme, and sequences 1800C are based on synchronization counters supporting a first fit mutex lock scheme. A fairshare mutex lock scheme may grant a lock to waiting tasks according to an order (e.g. requesting or arriving order) to allow each task contending for the lock getting a share of the lock. Other synchronization schemes, such as barrier, semaphore and condition variables are illustrated via sequences 1900A, 1900B and 1900C respectively.

For example, at sequence 1901 in FIG. 19A, the arrival of barrier request BW3 trigger a condition (e.g. the number of requests or threads reaches a number initialized for a barrier) to grant the lock to each requests for the lock. BW1 and BW2 may return from a queuerespectively at sequences 1903 and 1905. BW3 may be assigned as barrier serial thread (BST) returning with a predetermined value. Variations of condition variables, for example, based on timeout and/or broadcast settings, may be supported using counters. In some embodiments, multiple synchronization schemes may be implemented based on reader locks and/or writer locks supported using counters.

FIG. 20 describes exemplary APIs (application programming interface) for synchronization based on counters according to one embodiment of the present invention. In one embodiment, synchronization library 117 of FIG. 1 may include example APIs 2000. A lock request as a short reader may be based on exemplary API 2001. In some embodiments, a lock is granted to a short reader without kernel transitions according to certain conditions, such as, whether there are write or yielding write exclusive locks in progress, whether there is blocked write exclusive locks pending in queue, whether there is a long read shared lock in progress, and/or whether there is a single yielding writer (lock request) pending in queue. A short reader according to exemplary API 2001 may block waiting if there are writers (for an exclusive lock) pending in queue and/or there is no long reader active. A short reader may be granted with the lock in turn according to an order of waiting requests in the wait queue. Or, in some embodiments, when a long reader is granted with a lock, all blocked short readers (waiting in queue) are granted with the lock irrespective of how blocked writers are ordered in queue. A waiting short reader may be granted with a lock if there is one single yielding exclusive writer ordered in queue ahead the reader. When there is no writer waiting ahead, a short reader may be selected out of order from the wait queue (or jump ahead). Short readers up to the next writer as ordered in queue may jump ahead of waiting yielding writers.

In one embodiment, exemplary API 2003 provides a lock request as a long reader. A lock may be granted to a long reader without kernel transitions according to certain conditions including, for example, whether there is any writer or yielding writer in progress (e.g. have not released the granted lock) and/or whether there is any writer or yielding writer pending in queue. A long reader may block waiting in queue via kernel transitions if at least one writer (e.g. regular writer, yielding writer or other kinds of writer) is also waiting in queue. A waiting long reader may be granted with a lock in turn according to the wait queue. If multiple long readers are waiting in queue, all of the waiting long readers may be granted with a lock when one of them is granted with the lock. If a long reader is granted with a lock, all blocked short and long readers in queue may jump ahead. A long reader arriving in a queue after a lock has been already granted may not jump over waiting yielding writers.

In another embodiment, exemplary API 2005 provides a lock request as a writer (or regular writer). A lock may be granted to a writer (lock request) without kernel transitions when the lock is not currently owned and no request is waiting. A writer may block waiting in queue via kernel transitions if at least one writer (e.g. regular writer, yielding writer or other kinds of writer) is also waiting in queue. A writer waiting long reader may be granted with a lock in turn according to the wait queue. If multiple long readers are waiting in queue, all of the waiting long readers may be granted with a lock when one of them is granted with the lock. Short readers and long readers can jump ahead of writers. In one embodiment, a long reader arriving at a wait queue after a lock has been granted does not jump over waiting writers. Exemplary API 2007 may provide a lock request as a yielding writer. Typically, a yielding writer is granted with a lock from a wait queue in turn.

Figure 21:
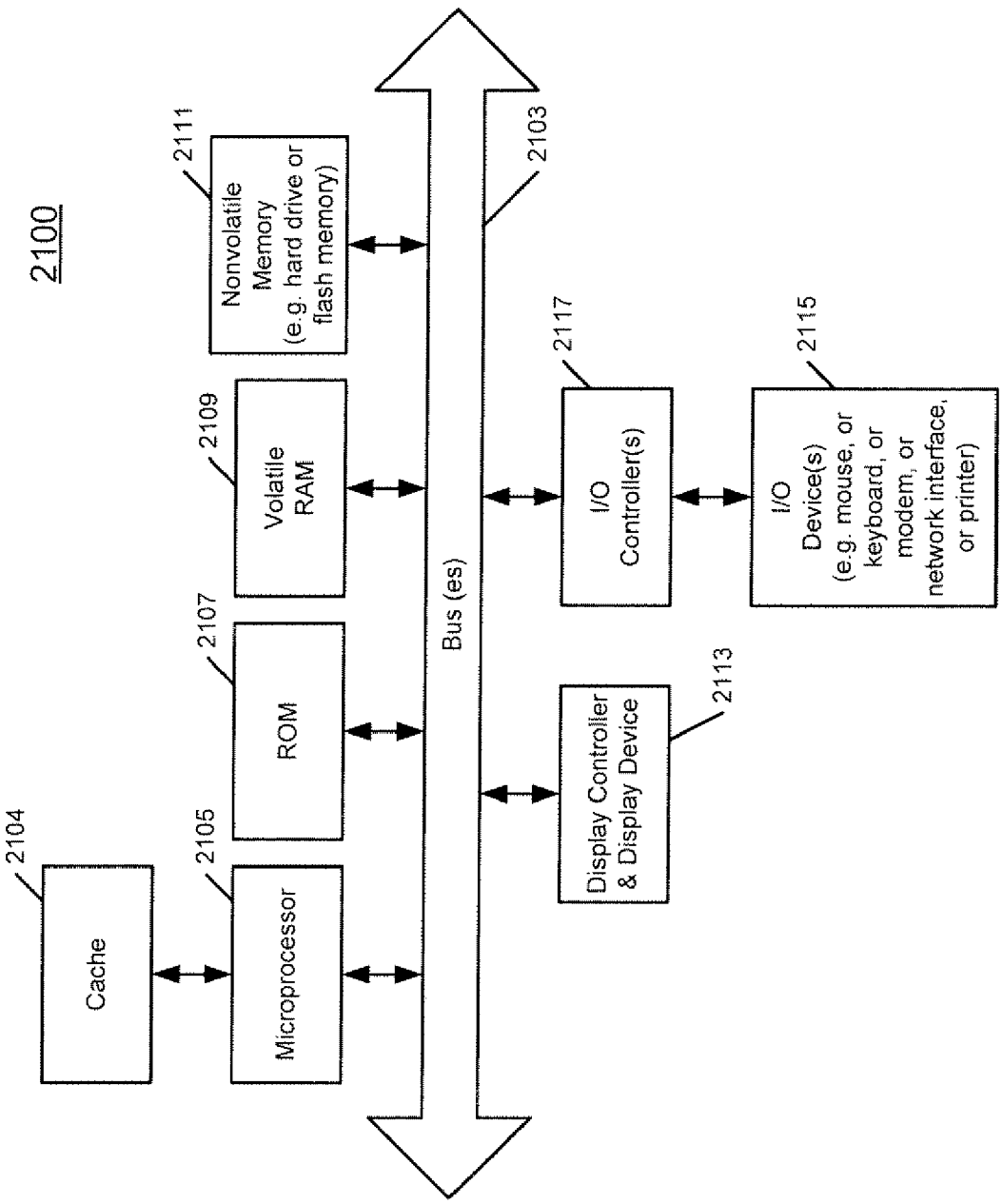
FIG. 21 illustrates one example of a typical computer system which may be used in conjunction with the embodiments described herein.

FIG. 21 shows one example of a data processing system which may be used with one embodiment the present invention. For example, the system 2100 may be implemented including a host as shown in FIG. 1. Note that while FIG. 21 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 21, the computer system 2100, which is a form of a data processing system, includes a bus 2103 which is coupled to a microprocessor(s) 2105 and a ROM (Read Only Memory) 2107 and volatile RAM 2109 and a non-volatile memory 2111. The microprocessor 2105 may retrieve the instructions from the memories 2107, 2109, 2111 and execute the instructions to perform operations described above. The bus 2103 interconnects these various components together and also interconnects these components 2105, 2107, 2109, and 2111 to a display controller and display device 2113 and to peripheral devices such as input/output (I/O) devices which may be mice, keyboards, modems, network interfaces, printers and other devices which are well known in the art. Typically, the input/output devices 2115 are coupled to the system through input/output controllers 2117. The volatile RAM (Random Access Memory) 2109 is typically implemented as dynamic RAM (DRAM) which requires power continually in order to refresh or maintain the data in the memory.

The mass storage 2111 is typically a magnetic hard drive or a magnetic optical drive or an optical drive or a DVD RAM or a flash memory or other types of memory systems which maintain data (e.g. large amounts of data) even after power is removed from the system. Typically, the mass storage 2111 will also be a random access memory although this is not required. While FIG. 21 shows that the mass storage 2111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 2103 may include one or more buses connected to each other through various bridges, controllers and/or adapters as is well known in the art.

Figure 22:
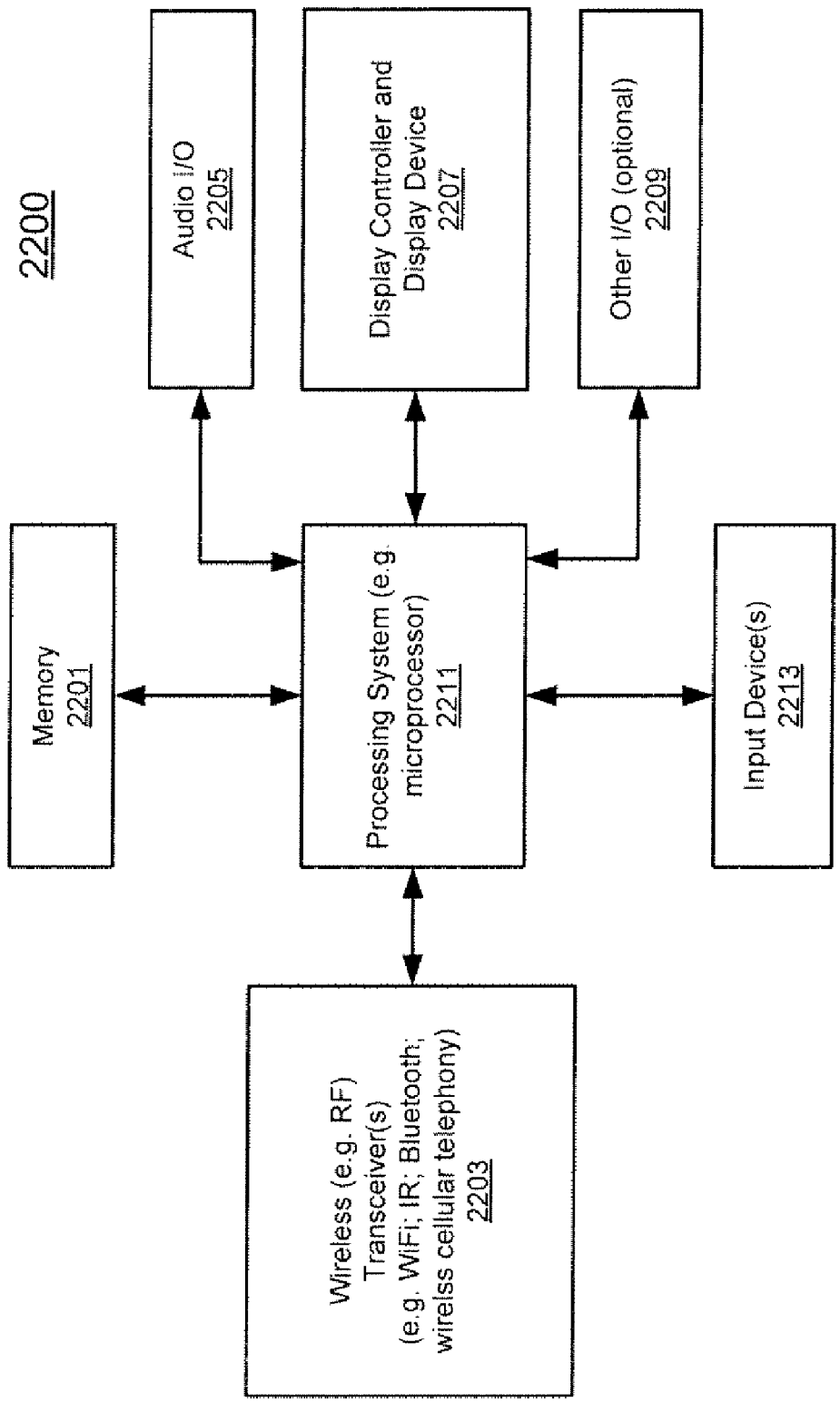
FIG. 22 shows an example of another data processing system which may be used with one embodiment of the present invention.

FIG. 22 shows an example of another data processing system which may be used with one embodiment of the present invention. For example, system 2200 may be implemented as part of system as shown in FIG. 1. The data processing system 2200 shown in FIG. 22 includes a processing system 2211, which may be one or more microprocessors, or which may be a system on a chip integrated circuit, and the system also includes memory 2201 for storing data and programs for execution by the processing system. The system 2200 also includes an audio input/output subsystem 2205 which may include a microphone and a speaker for, for example, playing back music or providing telephone functionality through the speaker and microphone.

A display controller and display device 2207 provide a visual user interface for the user; this digital interface may include a graphical user interface which is similar to that shown on an iPhone phone device or on a Macintosh computer when running OS X operating system software. The system 2200 also includes one or more wireless transceivers 2203 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 2200 in certain embodiments, and in certain embodiments fewer components than shown in FIG. 22 may also be used in a data processing system.

The data processing system 2200 also includes one or more input devices 2213 which are provided to allow a user to provide input to the system. These input devices may be a keypad or a keyboard or a touch panel or a multi touch panel. The data processing system 2200 also includes an optional input/output device 2209 which may be a connector for a dock. It will be appreciated that one or more buses, not shown, may be used to interconnect the various components as is well known in the art. The data processing system shown in FIG. 22 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 2200 may be a network computer or an embedded processing device within another device, or other types of data processing systems which have fewer components or perhaps more components than that shown in FIG. 22.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPhone, an iPod or iPod Nano media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:
maintaining a plurality of counters in memory including a lock counter and an unlock counter to synchronize a plurality of requests for a lock, the lock counter indicating a cumulative number of the requests, and the unlock counter indicating a cumulative number of a portion of the requests having released the lock, the requests stored with sequence numbers to wait for the lock, the sequence numbers counted via the lock counter, each request uniquely identified via one of the sequence numbers;
selecting at least one of the requests stored to grant the lock according to the sequence numbers, wherein the lock counter has a current count when the at least one request is selected, wherein the sequence numbers stored with the requests include consecutive sequence numbers less than the current count; and
performing the synchronized operations for the selected requests.

2. The method of claim 1, wherein maintaining the plurality of counters comprises:
counting up atomically the lock counter to initiate one of the requests; and
counting up atomically the unlock counter subsequent to performing the synchronized operations.

3. The method of claim 1, wherein the plurality of counters are maintained in an operating system for performing the synchronized operations.

4. The method of claim 1, wherein the selection of the at least one of the requests is independent of an interlock.

5. The method of claim 1, further comprising maintaining one or more flags indicating status of the lock.

6. The method of claim 5, wherein the flags include an exclusive flag indicating whether the lock is granted exclusively to at most one request at a time.

7. The method of claim 6, further comprising:
maintaining a wait queue to store the requests waiting for the lock.

8. The method of claim 7, wherein the counters and the wait queue are allocated in memory spaces with separate privileges in an operation system and wherein the maintenance of the counters and the maintenance of the wait queue are independent.

9. The method of claim 7, wherein the request is ordered in the wait queue based on the sequence numbers.

10. The method of claim 7, wherein maintaining the wait queue comprises:
locating the wait queue corresponding to the lock from a cache memory; and
creating the wait queue in the cache memory if the wait queue cannot be located.

11. The method of claim 7, wherein the one or more bit flags include a wait bit indicating whether there are remaining requests waiting in the wait queue.

12. The method of claim 1, wherein the lock is a mutex lock for synchronizing a plurality of threads corresponding to the plurality of lock requests.

13. The method of claim 1, wherein the selection is based on a synchronization scheme to grant the lock shared for a reader.

14. A machine-readable non-transitory storage medium having instructions, when executed by a machine, cause the machine to perform a method, the method comprising:

maintaining a plurality of counters in memory including a lock counter and an unlock counter to synchronize a plurality of requests for a lock, the lock counter indicating a cumulative number of the requests, and the unlock counter indicating a cumulative number of a portion of the requests having released the lock, the requests stored with sequence numbers to wait for the lock, the sequence numbers counted via the lock counter, each request uniquely identified via one of the sequence numbers;

selecting at least one of the requests stored to grant the lock according to the sequence numbers, wherein the lock counter has a current count when the at least one request is selected, wherein the sequence numbers stored with the requests include consecutive sequence numbers less than the current count; and performing the synchronized operations for the selected requests.

15. An apparatus comprising a processor and a memory storing executable code including a synchronization library, a kernel library and an interface module, the processor coupled to the memory to execute the executable code, the processor configured to:

maintain a plurality of counters in memory via the synchronization library in a user mode, the counters including a lock counter and an unlock counter to synchronize a plurality of requests for a lock, the lock counter indicating a cumulative number of the requests, and the unlock counter indicating a cumulative number of a portion of the requests having released the lock, the requests stored with sequence numbers to wait for the lock, the sequence numbers counted via the lock counter, each request uniquely identified via one of the sequence numbers, select at least one of the requests to grant a lock via the kernel library in a kernel mode according to the sequence numbers, wherein the lock counter has a current count when the at least one request is selected, wherein the sequence numbers stored with the requests include consecutive sequence numbers less than the current count, and perform the synchronized operations via the interface module for the selected requests.

16. A computer implemented method, comprising:

maintaining one or more counters to synchronize a plurality of requests for a lock, the counters having a state indicating values of the counters, the requests stored with sequence numbers to wait for the lock, the sequenced numbers counted via the state of the counters, each request uniquely identified via one of the sequence numbers;

calling a first kernel interface with a first state of the counters to wait for the lock for a particular one of the requests, the counters having the first state when the first kernel interface was called, the particular request associated with a particular one of the sequence numbers, the first state including the particular sequence number, wherein the first kernel interface returns when the lock is granted, wherein the counters have a second state when the lock is granted, the second state including a current sequence number, wherein the sequence numbers stored with the requests include consecutive sequence numbers less than the current sequence number;

updating the counters atomically based on the second state of the counters returned from the first kernel interface; and performing synchronized operations subsequent to the update of the counters.

17. The method of claim 16, wherein the plurality of counters are maintained in an operating system for performing the synchronized operations.

18. The method of claim 16, wherein the update of the counters is independent of an interlock.

19. The method of claim 16, wherein the updated counters have an update state, wherein the update comprises:

retrieving a current state of the counter; and determining the update state based on the second state and the current state of the counters.

20. The method of claim 19, wherein the counters include status flags, wherein the status flags include an exclusive flag indicating whether the lock is granted exclusively to at most one request.

21. The method of claim 20, wherein the status flags include a wait flag indicating whether there are remaining ones of the requests waiting for the lock.

22. A computer implemented method, comprising:

maintaining one or more counters to synchronize a plurality of requests for a lock, the counters having a state indicating values of the counters;

calling a first kernel interface with a first state to wait for the lock;

updating the counters atomically based on a second state of the counters returned from the first kernel interface; and performing synchronized operations subsequent to the update of the counters, wherein the updated counters have an update state, wherein the update comprises:

retrieving a current state of the counter, and determining the update state based on the second state and the current state of the counters, wherein the counters include status flags, wherein the status flags include an exclusive flag indicating whether the lock is granted exclusively to at most one request, wherein the status flags include a wait flag indicating whether there are remaining ones of the requests waiting for the lock, wherein the determination includes a transition table mapping the current state and the second state to the update state of the counters.

23. The method of claim 22, wherein the second state includes a bit set for the status flags, wherein the current state includes a current bit set for the status flags, wherein the update state includes an update bit set for the status flags, and wherein the transition table includes a setting for the update bit set indexed according to the bit set and the current bit set.

24. The method of claim 16, wherein the counters include a lock counter, wherein the state includes a lock count for the lock counter, and wherein the maintenance comprises:

retrieving a lock count from the lock counter; and updating the lock counter atomically counting up from the current lock count.

25. The method of claim 24, wherein the atomic update of the lock counter comprises:

comparing the lock counter with the lock count for the update.

26. The method of claim 24, wherein the counters include an unlock counter, the maintenance further comprising:

retrieving a current state from the counters subsequent to performing the synchronized operations, the current state including a current unlock count corresponding to the unlock counter; and updating the unlock counter atomically counting up from the current unlock count.

27. The method of claim 26, further comprising:

determining whether there are requests waiting for the lock; and resetting the lock and unlock counters if there is no request waiting for the lock.

28. The method of claim 27, wherein the current state includes a current lock count for the lock counter and wherein determining whether there are requests waiting for the lock is based on a relationship between the current lock count and the current unlock count.

29. A computer implemented method, comprising:
maintaining one or more counters to synchronize a plurality of requests for a lock, the counters having a state indicating values of the counters;
calling a first kernel interface with a first state to wait for the lock;
updating the counters atomically based on a second state of the counters returned from the first kernel interface;
performing synchronized operations subsequent to the update of the counters,
wherein the counters include a lock counter, wherein the state includes a lock count for the lock counter, and wherein the maintenance comprises:
retrieving a lock count from the lock counter, and
updating the lock counter atomically counting up from the current lock count,
wherein the counters include an unlock counter, the maintenance further comprising:
retrieving a current state from the counters subsequent to performing the synchronized operations, the current state including a current unlock count corresponding to the unlock counter, and
updating the unlock counter atomically counting up from the current unlock count;
determining whether there are requests waiting for the lock; and
resetting the lock and unlock counters if there is no request waiting for the lock, wherein the current state includes a current lock count for the lock counter, wherein determining whether there are requests waiting for the lock is based on a relationship between the current lock count and the current unlock count, wherein resetting the lock and unlock counters comprises:
updating the unlock counter from the current unlock count to a predetermined initial value,
performing a first atomic operation to update the lock counter from the current lock count to the predetermined initial value, and
if the first atomic operation is not successful, restoring the unlock counter from the predetermined initial value based on the current unlock count.

30. The method of claim 29, wherein restoring the unlock counter comprises:
retrieving a count from the unlock counter; and
performing a second atomic operation to update the unlock counter from the count to a sum of the count and the current unlock count.

31. The method of claim 30, wherein the restoration of the unlock counter is applied continuously until the second atomic operation is successful.

32. The method of claim 26, further comprising:
determining if the current state indicates the lock is ready for waiting requests; and
calling a second kernel interface according to the current state and the current unlock count if the lock is ready for the waiting requests.

33. The method of claim 32, wherein the counters include a waiter counter indicating a number of the waiting requests for the lock, wherein the current state includes a current waiter count for the waiter counter and a current lock count for the lock counter, and wherein the determination is based on a relationship among the lock count, the unlock count and the waiter count.

34. The method of claim 16, wherein the lock is exclusively acquired for the synchronized operations according to a synchronization scheme for a writer.

35. A machine-readable non-transitory storage medium having instructions, when executed by a machine, cause the machine to perform a method, the method comprising:
maintaining one or more counters in memory to synchronize a plurality of requests for a lock, the counters having a state indicating values of the counters, the requests stored with sequence numbers to wait for the lock, the sequence numbers counted via the state of the counters, each request uniquely identified via one of the sequence numbers;
calling a first kernel interface with a first state of the counters to wait for the lock for a particular one of the requests, the counters having the first state when the first kernel interface was called, the particular request stored with a particular one of the sequence numbers, the first state including the particular sequence number, wherein the first kernel interface returns when the lock is granted, wherein the counters have a second state when the lock is granted, the second state including a current sequence number, wherein the sequence numbers stored with the requests include consecutive sequence numbers less than the current sequence number;
updating the counters atomically based on the second state of the counters returned from the first kernel interface; and
performing synchronized operations subsequent to the update of the counters.

36. An apparatus comprising a processor and a memory storing executable code including a user library and an interface module, the processor coupled to the memory to execute the executable code, the processor configured to:
maintain one or more counters in memory via the user library to synchronize a plurality of requests for a lock, the counters having a state indicating values of the counters, the requests stored with sequence numbers to wait for the lock, the sequence numbers counted via the state of the counters, each request uniquely identified via one of the sequence numbers, the user library comprising:
a lock handler module configured to call a first kernel interface with a first state to wait for the lock for a particular one of the requests, the counters having the first state when the first kernel interface was called, the particular request stored with a particular one of the sequence numbers, the first state including the particular sequence number, wherein the first kernel interface returns when the lock is granted, wherein the counters have a second state when the lock is granted, the second state including a current sequence number, wherein the sequence numbers stored with the requests include consecutive sequence numbers less than the current sequence number, and
an unlock handler module configured to update the counters atomically based on the second state of the counters returned from the first kernel interface, and
perform synchronized operations via the interface module subsequent to the update of the counters.

37. A computer implemented method, comprising:
maintaining one or more counters in memory to synchronize a plurality of lock requests, the lock requests stored with sequence numbers to wait for a lock, the sequence numbers counted via the counters, each lock request uniquely identified via one of the sequence numbers corresponding to a lock count indicating a cumulative number of the lock requests already initiated for the lock when the lock request is received in a wait queue;
in response to receiving an unlock request to release the lock, the unlock request including a current lock count of the counters when the unlock request is received, comparing the current lock count with the sequence numbers to determine whether to expect additional lock requests for the lock, wherein no additional lock requests for the lock is expected if the sequence numbers stored with the requests include consecutive sequence numbers less than the current lock count;
selecting one or more of the lock requests from the wait queue to grant the lock if no additional lock requests for the lock is expected; and
performing synchronized operations for the selected lock requests.

38. The method of claim 37, wherein the counters are maintained in an operating system for performing the synchronized operations.

39. The method of claim 37, wherein the maintenance of the counters is independent of an interlock.

40. The method of claim 37, wherein the counters include one or more sequence counters including a target sequence counter for identifying the additional lock requests expected, wherein the counters include a wait counter indicating a number of the additional lock requests expected, and wherein the state includes a target count and a wait count corresponding to the target sequence counter and the wait counter.

41. A computer implemented method, comprising
maintaining one or more counters in memory to synchronize a plurality of lock requests, each lock request being associated with a lock count indicating a cumulative number of the lock requests initiated for a lock when the lock request is received in a wait queue;
in response to receiving an unlock request to release the lock, comparing a state of the counters with the unlock request to determine whether to expect additional lock requests;
selecting one or more of the lock requests from the wait queue to grant the lock if no additional lock requests is expected; and
performing synchronized operations for the selected lock requests,
wherein the counters include one or more sequence counters including a target sequence counter for identifying the additional lock requests expected, wherein the counters include a wait counter indicating a number of the additional lock requests expected, and wherein the state includes a target count and a wait count corresponding to the target sequence counter and the wait counter, and wherein the maintenance comprises:
in response to receiving a lock request including a lock count, determining if the lock request is one of the additional requests expected; and
inserting the lock request to the wait queue if the lock request is not one of the additional requests expected.

42. The method of claim 41, wherein the determination is based on a comparison between the target count and the lock count.

43. The method of claim 41, wherein the lock request in the wait queue is associated with a sequence number corresponding to the lock count.

44. The method of claim 41, wherein there is no additional requests expected if the sequence counters are empty.

45. The method of claim 41, wherein the lock request is not one of the additional requests expected if the lock count is greater than the target count.

46. The method of claim 41, wherein the maintenance further comprises:
counting down the wait counter atomically from the wait count if the lock request is one of the additional requests expected.

47. The method of claim 40, wherein each lock request in the wait queue is associated with a sequence number corresponding to the lock count of the lock request, the sequence number indicating a consecutive order within the wait queue.

48. A computer implemented method, comprising:
maintaining one or more counters in memory to synchronize a plurality of lock requests, each lock request being associated with a lock count indicating a cumulative number of the lock requests initiated for a lock when the lock request is received in a wait queue;
in response to receiving an unlock request to release the lock, comparing a state of the counters with the unlock request to determine whether to expect additional lock requests;
selecting one or more of the lock requests from the wait queue to grant the lock if no additional lock requests is expected;
performing synchronized operations for the selected lock requests,
wherein the counters include one or more sequence counters including a target sequence counter for identifying the additional lock requests expected, wherein the counters include a wait counter indicating a number of the additional lock requests expected, and wherein the state includes a target count and a wait count corresponding to the target sequence counter and the wait counter,
wherein each lock request in the wait queue is associated with a sequence number corresponding to the lock count of the lock request, the sequence number indicating a consecutive order within the wait queue;
in response to receiving an unlock request to release the lock, determining whether the unlock request is a spurious request; and
determining the number of the additional lock requests expected if the unlock request is not a spurious request.

49. The method of claim 48, wherein the unlock request is associated with a waiter count indicating an expected number of lock requests waiting in the wait queue, and wherein the number of the additional lock request is determined based on a difference between a total number of one or more requests currently waiting in the wait queue and the waiter count.

50. The method of claim 49, wherein the one or more requests are associated with sequence numbers no greater than the lock count.

51. The method of claim 48, wherein a last unlock sequence number is associated with a latest unlock request releasing the lock, and wherein the spurious request is determined based on a comparison between an unlock count associated with the unlock request and the last unlock sequence number.

52. The method of claim 48, wherein no additional lock request is expected if lock requests associated with sequence numbers smaller than the lock count associated with the unlock request are consecutive in order from the lock count within the wait queue.

53. The method of 52, further comprising:
updating the counters according to the unlock request and the number of the additional lock requests expected.

54. The method of claim 53, wherein the target sequence counter is updated with the lock count of the unlock request.

55. The method of claim 53, wherein the unlock request is associated with an unlock count indicating a cumulative number of the lock requests having released the lock after completing the synchronized operations.

56. The method of claim 53, wherein the wait counter is updated with the number of the additional lock requests expected.

57. The method of claim 48, further comprising:
resetting the counters if none of the additional lock requests is expected.

58. The method of claim 48, wherein each of the selected lock requests is associated with a return value including one or more status flags indicating whether there is any remaining lock request requesting the lock as a writer.

59. The method of claim 58, wherein the status flags indicate whether the lock is exclusively granted to the selected lock requests.

60. The method of claim 37, wherein the lock is selected shared according to a synchronization scheme for a long reader and wherein the wait queue is updated to grant all waiting readers with the lock.

61. A machine-readable non-transitory storage medium having instructions, when executed by a machine, cause the machine to perform a method, the method comprising:
maintaining one or more counters in memory to synchronize a plurality of lock requests, the lock requests stored with sequence numbers to wait for the lock, the sequence numbers counted via the counters, each lock request uniquely identified via one of the sequence numbers corresponding to a lock count indicating a cumulative number of the lock requests already initiated for a lock when the lock request is received in a wait queue;
in response to receiving an unlock request to release the lock, the unlock request including a current lock count of the counters when the unlock request is received, comparing the current lock count with the sequence numbers to determine whether to expect additional lock requests for the lock, wherein no additional lock requests for the lock is expected if the sequence numbers stored with the requests include consecutive sequence numbers less than the current lock count;
selecting one or more of the lock requests from the wait queue to grant the lock if no additional lock requests for the lock is expected; and
performing synchronized operations for the selected lock requests.

62. An apparatus comprising a processor and a memory storing executable code including a kernel library and an interface module, the processor coupled to the memory to execute the executable code, the processor configured to:
store one or more lock requests in a wait queue, the lock requests stored with sequence numbers counted via the counters, each lock request uniquely identified via one of the sequence numbers corresponding to a lock count indicating a cumulative number of the lock requests already initiated for a lock wherein the lock request is received in the wait queue;
maintain one or more counters in memory via the kernel library to synchronize the lock requests, wherein the sequence numbers correspond to different lock counts counted via the counters;
in response to receiving an unlock request to release the lock, the unlock request including a current lock count of the counters when the unlock request is received, compare the current lock count with the sequence numbers via the kernel library to determine whether to expect additional lock requests for the lock, wherein no additional lock requests for the lock is expected if the sequence numbers stored with the requests include consecutive sequence numbers less than the current lock count;
select one or more of the lock requests from the wait queue via the kernel library to grant the lock if no additional lock requests for the lock is expected; and
perform synchronized operations via the interface module subsequent to the update of the counters.

63. A computer implemented method, comprising:
counting up a lock counter in memory atomically to wait for a lock for a particular task to synchronize operations among a plurality of tasks including the particular task, the tasks stored with sequence numbers to wait for the lock, the sequence numbers counted via the lock counter, each task uniquely identified via one of the sequence numbers, the particular task stored with a particular one of the sequence numbers, wherein the lock counter is counted up to a particular value corresponding to the particular sequence number;
when the lock is granted for the particular task, performing the synchronized operations for at least one of the plurality of tasks, wherein the lock counter has a current value when the lock is granted, and wherein the sequence numbers stored with the tasks include consecutive sequence numbers less than the current value; and
counting up an unlock counter in the memory atomically subsequent to the synchronized operations.

64. The method of claim 63, wherein the lock and unlock counters are allocated in an operating system for performing the synchronized operations.

65. The method of claim 63, wherein the counting of the lock and unlock counters is independent of an interlock.

66. The method of claim 63, further comprising:
determining if any of the tasks is still waiting for the lock subsequent to the synchronized operations.

67. The method of claim 66, wherein the determination is based on a comparison of the lock counter and the unlock counter.

68. The method of claim 66, wherein the unlock counter is counted up if at least one of the tasks is determined waiting for the lock.

69. The method of claim 63, wherein one or more waiters are queued waiting for the lock, the method further comprising:
maintaining one or more status flags to indicate a status of the waiters.

70. The method of claim 64, wherein the lock is exclusively granted according to a synchronization scheme for a yielding writer based on the lock and unlock counters, and wherein one of the status flags indicates no yielding writer remaining in the waiters.

* * * * *